US011778527B2

(12) United States Patent
Kumar et al.

(10) Patent No.: US 11,778,527 B2
(45) Date of Patent: Oct. 3, 2023

(54) REPORTING FOR CONDITIONAL PRIMARY SECONDARY CELL ADDITION OR CHANGE

(71) Applicant: QUALCOMM Incorporated, San Diego, CA (US)

(72) Inventors: Rajeev Kumar, San Diego, CA (US); Punyaslok Purkayastha, San Diego, CA (US); Shankar Krishnan, San Diego, CA (US); Xipeng Zhu, San Diego, CA (US); Ozcan Ozturk, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 17/365,254

(22) Filed: Jul. 1, 2021

(65) Prior Publication Data
US 2023/0007550 A1    Jan. 5, 2023

(51) Int. Cl.
*H04W 36/24* (2009.01)
*H04W 36/00* (2009.01)

(52) U.S. Cl.
CPC ....... *H04W 36/0079* (2018.08); *H04W 36/24* (2013.01)

(58) Field of Classification Search
USPC ........................................................ 370/331
See application file for complete search history.

(56) References Cited

U.S. PATENT DOCUMENTS

| 2020/0351734 | A1* | 11/2020 | Purkayastha | ......... H04W 36/30 |
| 2021/0153055 | A1* | 5/2021 | Lee | ....................... H04W 24/08 |
| 2021/0258852 | A1* | 8/2021 | Selvaganapathy | ........................... H04W 36/0069 |
| 2021/0377831 | A1* | 12/2021 | Yan | ................... H04W 36/0077 |
| 2023/0047617 | A1* | 2/2023 | Kumar | ............ H04W 36/00837 |

(Continued)

FOREIGN PATENT DOCUMENTS

| WO | WO-2021067236 A1 | 4/2021 | |
| WO | WO-2021109394 A1 | 6/2021 | |
| WO | WO-2021154140 A1 * | 8/2021 | ........ H04W 36/0061 |

(Continued)

OTHER PUBLICATIONS

International Search Report and Written Opinion—PCT/US2022/033634—ISA/EPO—dated Sep. 28, 2022.

(Continued)

*Primary Examiner* — Gregory B Sefcheck
*Assistant Examiner* — Majid Esmaeilian
(74) *Attorney, Agent, or Firm* — Holland & Hart LLP

(57) ABSTRACT

Methods, systems, and devices for wireless communications are described. A user equipment (UE) may receive, from a master node associated with a primary cell, a configuration for a conditional procedure for adding or changing a primary secondary cell (PSCell) associated with a secondary node. The UE may also receive, from the master node, a configuration for a handover procedure for the primary cell. The UE may transmit a report that includes information related to the conditional PSCell procedure, information related to the primary secondary cell, or both, based on a triggering order between the conditional PSCell procedure and the handover procedure.

30 Claims, 14 Drawing Sheets

(56) References Cited

U.S. PATENT DOCUMENTS

2023/0067377 A1* 3/2023 Wu .................. H04W 36/0058

FOREIGN PATENT DOCUMENTS

WO  WO-2021172964 A1 * 9/2021 ............ H04W 76/19
WO  WO-2021194134 A1 * 9/2021 ........ H04W 36/0079

OTHER PUBLICATIONS

Qualcomm Incorporated: "Other CPAC Aspects", 3GPP TSG-RAN WG2 Meeting #114-e, R2-2105262, 3rd Generation Partnership Project, Mobile Competence Centre, 650, Route Des Lucioles, F-06921 Sophia-Antipolis Cedex, France, vol. RAN WG2, No. Online, May 19, 2021-May 27, 2021, May 11, 2021, XP052006911, 8 Pages, Sections 3, 4.

\* cited by examiner

REPORTING FOR CONDITIONAL PRIMARY SECONDARY CELL ADDITION OR CHANGE

FIELD OF TECHNOLOGY

The following relates to wireless communications, including reporting for conditional primary secondary cell addition or change.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may add or change serving cells. Improved techniques for communicating information related to adding or changing serving cells may be desired.

SUMMARY

The described techniques relate to improved methods, systems, devices, and apparatuses that support reporting for conditional primary secondary cell (PSCell) addition or change. A user equipment (UE) may be configured with a configuration for conditional procedure for adding or changing a PSCell, which may be referred to as a conditional PSCell procedure. The UE may also be configured with a configuration for handing over a primary cell (PCell). The UE may report information related to the conditional PSCell procedure based on the triggering order between the conditional PSCell procedure and the handover procedure.

A method for wireless communication at a UE is described. The method may include receiving, from a master node associated with a primary cell, a configuration for a conditional procedure for adding or changing a primary secondary cell associated with a secondary node, receiving, from the master node, a configuration for a handover procedure for the primary cell, and transmitting a report including information related to the conditional procedure, information related to the primary secondary cell, or both, based on a triggering order between the conditional procedure and the handover procedure.

An apparatus for wireless communication at a UE is described. The apparatus may include a processor, memory coupled with the processor, and instructions stored in the memory. The instructions may be executable by the processor to cause the apparatus to receive, from a master node associated with a primary cell, a configuration for a conditional procedure for adding or changing a primary secondary cell associated with a secondary node, receive, from the master node, a configuration for a handover procedure for the primary cell, and transmit a report including information related to the conditional procedure, information related to the primary secondary cell, or both, based on a triggering order between the conditional procedure and the handover procedure.

Another apparatus for wireless communication at a UE is described. The apparatus may include means for receiving, from a master node associated with a primary cell, a configuration for a conditional procedure for adding or changing a primary secondary cell associated with a secondary node, means for receiving, from the master node, a configuration for a handover procedure for the primary cell, and means for transmitting a report including information related to the conditional procedure, information related to the primary secondary cell, or both, based on a triggering order between the conditional procedure and the handover procedure.

A non-transitory computer-readable medium storing code for wireless communication at a UE is described. The code may include instructions executable by a processor to receive, from a master node associated with a primary cell, a configuration for a conditional procedure for adding or changing a primary secondary cell associated with a secondary node, receive, from the master node, a configuration for a handover procedure for the primary cell, and transmit a report including information related to the conditional procedure, information related to the primary secondary cell, or both, based on a triggering order between the conditional procedure and the handover procedure.

In some examples of the method, apparatuses, and non-transitory computer-readable medium described herein, the handover procedure includes a conditional handover procedure and the method, apparatuses, and non-transitory computer-readable medium may include further operations, features, means, or instructions for determining that the conditional procedure may be triggered before the conditional handover procedure, where the report may be transmitted to the master node based on determining that the conditional procedure may be triggered before the conditional handover procedure.

Some examples of the method, apparatuses, and non-transitory computer-readable medium described herein may further include operations, features, means, or instructions for determining that the conditional procedure may have failed, where the report indicates the conditional procedure failure and including in the report, based on determining that the conditional procedure may have failed, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

In some examples of the method, apparatuses, and non-transitory computer-readable medium described herein, the measurement information includes measurement information for the primary secondary cell, measurement information for a target primary secondary cell, or both, measurement information for one or more neighboring cells, an indication of whether the one or more neighboring cells may be candidate cells for the conditional procedure, or a combination thereof.

In some examples of the method, apparatuses, and non-transitory computer-readable medium described herein, the report may be for a first radio access technology and the measurement information includes measurement information for frequencies for a second radio access technology different than the first radio access technology.

In some examples of the method, apparatuses, and non-transitory computer-readable medium described herein, the timing information includes a duration between receiving the configuration for the conditional procedure and the conditional procedure failing, a duration between receiving the configuration for the conditional procedure and attempting the conditional procedure, a duration between receiving the configuration for the conditional procedure and attempting a non-conditional procedure for adding or changing the primary secondary cell, a duration between the failed conditional procedure and a second failed conditional procedure, or a combination thereof.

In some examples of the method, apparatuses, and non-transitory computer-readable medium described herein, the condition information includes a list of primary secondary cells that may have met a set of conditions for triggering the conditional procedure, and indication of whether a target primary secondary cell was a candidate cell for the conditional procedure, or a combination thereof.

In some examples of the method, apparatuses, and non-transitory computer-readable medium described herein, the state information includes an indication of a state of the primary secondary cell before reception of the configuration for the conditional procedure, an indication of a state of the primary secondary cell before attempting the conditional procedure, an indication of whether a state of the primary secondary cell was changed during the conditional procedure, an indication of whether a state of the primary secondary cell was changed between reception of the configuration for the conditional procedure and attempting the conditional procedure, or a combination thereof.

Some examples of the method, apparatuses, and non-transitory computer-readable medium described herein may further include operations, features, means, or instructions for determining radio link failure at the primary cell during the conditional procedure, where the report indicates the radio link failure and may be transmitted to the master node based on the determining the radio link failure and including in the report, based on determining the radio link failure, an indication of whether the configuration for the conditional handover procedure was discarded based on the conditional procedure triggering, an indication of a duration between receiving the configuration for the conditional handover procedure and the conditional procedure triggering, an indication of a duration between the conditional procedure triggering and the radio link failure, an indication of a duration between receiving the configuration for the conditional handover procedure and receiving a command modifying the conditional handover procedure, measurement information for the primary secondary cell, or a combination thereof.

Some examples of the method, apparatuses, and non-transitory computer-readable medium described herein may further include operations, features, means, or instructions for determining that the conditional procedure may have failed, where the report indicates the conditional procedure failure and including in the report, based on the conditional procedure failing, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

Some examples of the method, apparatuses, and non-transitory computer-readable medium described herein may further include operations, features, means, or instructions for determining that the conditional procedure was successful, the conditional handover procedure was successful, or both and including in the report, based on the conditional procedure being successful, the conditional handover procedure being successful, or both, an identifier of the primary secondary cell, an identifier of a target primary secondary cell, a state of the primary secondary cell, an indication of a duration of time the primary secondary cell was in the state before the conditional procedure, or a combination thereof.

Some examples of the method, apparatuses, and non-transitory computer-readable medium described herein may further include operations, features, means, or instructions for including in the report one or more of radio link management results for the primary secondary cell, an indication of whether a radio link management issue or beam failure detection issue for the primary secondary cell may have been detected, measurement information obtained for neighboring primary secondary cells before the configuration for the conditional procedure was received, measurement information obtained for the primary secondary cell, for candidate primary secondary cells for the conditional procedure, or a combination thereof, an indication of triggering conditions for the candidate primary secondary cells, a radio quality metric for the primary secondary cell, an indication of whether a radio quality metric for the primary secondary cell may have deteriorated during the conditional procedure, or a combination thereof, an indication of a duration between receiving the configuration for the conditional handover procedure and the conditional procedure triggering, an indication of a duration between the conditional procedure triggering and detecting a lower layer issue at the primary cell, or an indication of a duration between the conditional procedure triggering and radio link failure at the primary cell.

Some examples of the method, apparatuses, and non-transitory computer-readable medium described herein may further include operations, features, means, or instructions for determining a triggering condition for the report may be satisfied, where the triggering condition includes a timer for the primary secondary cell satisfying a threshold, a timer for the primary cell satisfying a threshold, or a combination thereof, and where the report may be transmitted based on the triggering condition being satisfied.

In some examples of the method, apparatuses, and non-transitory computer-readable medium described herein, the handover procedure includes a conditional handover procedure and the method, apparatuses, and non-transitory computer-readable medium may include further operations, features, means, or instructions for determining that the conditional handover procedure may be triggered before, or concurrently with, the conditional procedure, where the report may be transmitted to the master node based on the determination.

Some examples of the method, apparatuses, and non-transitory computer-readable medium described herein may further include operations, features, means, or instructions for determining radio link failure at the primary secondary cell during the conditional handover procedure, where the report indicates the radio link failure and including in the report, based on determining the radio link failure, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

Some examples of the method, apparatuses, and non-transitory computer-readable medium described herein may further include operations, features, means, or instructions for determining that the conditional handover procedure may have failed, where the report indicates the conditional handover procedure failure and including in the report, based on determining that the conditional handover procedure may have failed, an indication of whether the configuration for the conditional procedure was discarded based on the conditional handover procedure triggering, an indication of a duration between receiving the configuration for the conditional procedure and the conditional handover procedure triggering, an indication of a duration between the conditional handover procedure triggering and radio link failure at the primary secondary cell, measurement information for the primary secondary cell, or a combination thereof.

Some examples of the method, apparatuses, and non-transitory computer-readable medium described herein may further include operations, features, means, or instructions for determining radio link failure at the primary secondary cell, where the report indicates the radio link failure and including in the report, based on the determining the radio link failure, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

Some examples of the method, apparatuses, and non-transitory computer-readable medium described herein may further include operations, features, means, or instructions for determining that the conditional procedure was successful, the conditional handover procedure was successful, or both and including in the report, based on the conditional procedure being successful, the conditional handover procedure being successful, or both, an identifier of the primary secondary cell, an identifier of a target primary secondary cell, a state of the primary secondary cell, an indication of a duration of time the primary secondary cell was in the state before the conditional procedure, or a combination thereof.

Some examples of the method, apparatuses, and non-transitory computer-readable medium described herein may further include operations, features, means, or instructions for including in the report one or more of radio link management results for the primary secondary cell, an indication of whether a radio link management issue or beam failure detection issue for the primary secondary cell may have been detected, measurement information obtained for neighboring primary secondary cells before the configuration for the conditional procedure was received, measurement information obtained for the primary secondary cell, for candidate primary secondary cells for the conditional procedure, or a combination thereof, an indication of triggering conditions for the candidate primary secondary cells, a radio quality metric for the primary secondary cell, an indication of whether a radio quality metric for the primary secondary cell may have deteriorated during the conditional procedure, or a combination thereof, an indication of a duration between receiving the configuration for the conditional procedure and the conditional handover procedure triggering, or an indication of a duration between the conditional handover procedure triggering and detecting a radio link issue, a beam failure issue, or a lower layer issue at the primary cell.

In some examples of the method, apparatuses, and non-transitory computer-readable medium described herein, the handover procedure includes a non-conditional handover procedure or a Dual Active Protocol Stack handover procedure and the method, apparatuses, and non-transitory computer-readable medium may include further operations, features, means, or instructions for determining whether the conditional procedure may be triggered before receipt of a command triggering the handover procedure, where the report may be transmitted based on the determination.

Some examples of the method, apparatuses, and non-transitory computer-readable medium described herein may further include operations, features, means, or instructions for determining radio link failure at the primary secondary cell during the handover procedure, where the report indicates the radio link failure and including in the report, based on determining the radio link failure, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

Some examples of the method, apparatuses, and non-transitory computer-readable medium described herein may further include operations, features, means, or instructions for determining that the handover procedure may have failed, where the report indicates the handover procedure failure and including in the report, based on determining that the handover procedure failed, an indication of whether the configuration for the conditional procedure was received before the command triggering the handover procedure, an indication of a duration between triggering the conditional procedure and receipt of the command triggering the handover procedure, an indication of a duration between receiving the configuration for the conditional procedure and determining radio link failure at the primary secondary cell, measurement information for the primary secondary cell, measurement information for a target primary secondary cell, measurement information for one or more neighboring cells, an identifier of the primary secondary cell, an identifier of the target primary secondary cell, or a combination thereof.

Some examples of the method, apparatuses, and non-transitory computer-readable medium described herein may further include operations, features, means, or instructions for determining radio link failure at the primary secondary cell, where the report indicates the radio link failure and including an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

Some examples of the method, apparatuses, and non-transitory computer-readable medium described herein may further include operations, features, means, or instructions for determining that the conditional procedure was successful, the handover procedure was successful, or both and including in the report, based on the conditional procedure being successful, the handover procedure being successful, or both, an identifier of the primary secondary cell, an identifier of a target primary secondary cell, a state of the primary secondary cell, an indication of a duration of time the primary secondary cell was in the state before the conditional procedure, or a combination thereof.

Some examples of the method, apparatuses, and non-transitory computer-readable medium described herein may further include operations, features, means, or instructions for including in the report one or more of radio link management results for the primary secondary cell, an indication of whether a radio link management issue or beam failure detection issue for the primary secondary cell may have been detected, measurement information obtained for neighboring primary secondary cells before the configuration for the conditional procedure was received, measurement information obtained for the primary secondary cell, for the target primary secondary cell, for candidate primary secondary cells for the conditional procedure, for one or more neighboring cells, or a combination thereof, an indication of triggering conditions for the candidate primary secondary cells, a radio quality metric for the primary secondary cell, an indication of whether a radio quality metric for the primary secondary cell may have deteriorated during the conditional procedure, or a combination thereof, an indication of a duration between receiving the configuration conditional procedure triggering and receiving the command triggering the handover procedure, an indication of a duration between receiving the configuration for the conditional procedure and radio link failure at the primary cell, or an identifier of the primary secondary cell, an identifier of the target primary secondary cell, or a combination thereof.

A method for wireless communication at a master node is described. The method may include transmitting, to a UE, a configuration for a conditional procedure for changing or adding a primary secondary cell associated with a secondary node, transmitting, to the UE, a configuration for a handover procedure for a primary cell associated with the master node, and receiving a report including information related to the conditional procedure, information related to the primary secondary cell, or both, from a second master node involved in the handover procedure after successful handover of the primary cell to the second master node.

An apparatus for wireless communication at a master node is described. The apparatus may include a processor, memory coupled with the processor, and instructions stored in the memory. The instructions may be executable by the processor to cause the apparatus to transmit, to a UE, a configuration for a conditional procedure for changing or adding a primary secondary cell associated with a secondary node, transmit, to the UE, a configuration for a handover procedure for a primary cell associated with the master node, and receive a report including information related to the conditional procedure, information related to the primary secondary cell, or both, from a second master node involved in the handover procedure after successful handover of the primary cell to the second master node.

Another apparatus for wireless communication at a master node is described. The apparatus may include means for transmitting, to a UE, a configuration for a conditional procedure for changing or adding a primary secondary cell associated with a secondary node, means for transmitting, to the UE, a configuration for a handover procedure for a primary cell associated with the master node, and means for receiving a report including information related to the conditional procedure, information related to the primary secondary cell, or both, from a second master node involved in the handover procedure after successful handover of the primary cell to the second master node.

A non-transitory computer-readable medium storing code for wireless communication at a master node is described. The code may include instructions executable by a processor to transmit, to a UE, a configuration for a conditional procedure for changing or adding a primary secondary cell associated with a secondary node, transmit, to the UE, a configuration for a handover procedure for a primary cell associated with the master node, and receive a report including information related to the conditional procedure, information related to the primary secondary cell, or both, from a second master node involved in the handover procedure after successful handover of the primary cell to the second master node.

In some examples of the method, apparatuses, and non-transitory computer-readable medium described herein, the report indicates radio link failure at the primary secondary cell, and the report includes an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

A method for wireless communication at a master node is described. The method may include participating in a successful handover procedure with a UE and a second master node, receiving a report including information related to the conditional procedure, information related to the primary secondary cell, or both, from the UE based on the successful handover procedure, and transmitting at least some of the information from the report to the second master node based on receiving the report from the UE.

An apparatus for wireless communication at a master node is described. The apparatus may include a processor, memory coupled with the processor, and instructions stored in the memory. The instructions may be executable by the processor to cause the apparatus to participate in a successful handover procedure with a UE and a second master node, receive a report including information related to the conditional procedure, information related to the primary secondary cell, or both, from the UE based on the successful handover procedure, and transmit at least some of the information from the report to the second master node based on receiving the report from the UE.

Another apparatus for wireless communication at a master node is described. The apparatus may include means for participating in a successful handover procedure with a UE and a second master node, means for receiving a report including information related to the conditional procedure, information related to the primary secondary cell, or both, from the UE based on the successful handover procedure, and means for transmitting at least some of the information from the report to the second master node based on receiving the report from the UE.

A non-transitory computer-readable medium storing code for wireless communication at a master node is described. The code may include instructions executable by a processor to participate in a successful handover procedure with a UE and a second master node, receive a report including information related to the conditional procedure, information related to the primary secondary cell, or both, from the UE based on the successful handover procedure, and transmit at least some of the information from the report to the second master node based on receiving the report from the UE.

In some examples of the method, apparatuses, and non-transitory computer-readable medium described herein, the report indicates radio link failure at the primary secondary cell, and the report includes an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof

DETAILED DESCRIPTION

In some wireless communications systems, a user equipment (UE) may add or change a serving cell, such as a primary secondary cell (PSCell). For example, a UE may use a conditional PSCell procedure (such as conditional PSCell add or change (CPAC) procedure) to add a PSCell or to change a PSCell. The UE may be configured with the conditional PSCell procedure and may perform (or attempt to perform) the conditional PSCell procedure when a set of triggering conditions for the conditional PSCell procedure is satisfied. However, the wireless communications system may not support communication of information related to the conditional PSCell procedure, which may negatively impact the performance of the wireless communications system.

According to the techniques described herein, a UE may report information related to a conditional procedure for adding a PSCell or changing PSCells. The reported information can be used by the network to enhance the conditional PSCell addition or change procedures.

In some examples, the information reported by the UE may also include or indicate the coexistence of primary Cell (PCell) and PSCell procedures at the UE, which may refer to the types of serving cell procedures configured at the UE. For example, the UE may be configured with a configuration for a handover procedure (e.g., a legacy handover, a conditional handover, or a Dual Active Protocol Stack (DAPS) handover) for a PCell in addition to being configured with the configuration for the conditional PSCell procedure. Additionally or alternatively, the information reported by the UE may be based on the triggering order for the serving cell procedures. For example, the UE may report different information depending on whether the conditional PSCell procedure or the handover procedure is triggered first. Additionally or alternatively, the information reported by the UE may be based on a failure or success status of the serving cell(s) (e.g., PCell and PSCell) procedure(s), the connection status of the serving cell(s) (PCell and PSCell), or both, among other factors.

Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to reporting for conditional primary secondary cell addition or change.

Figure 1:
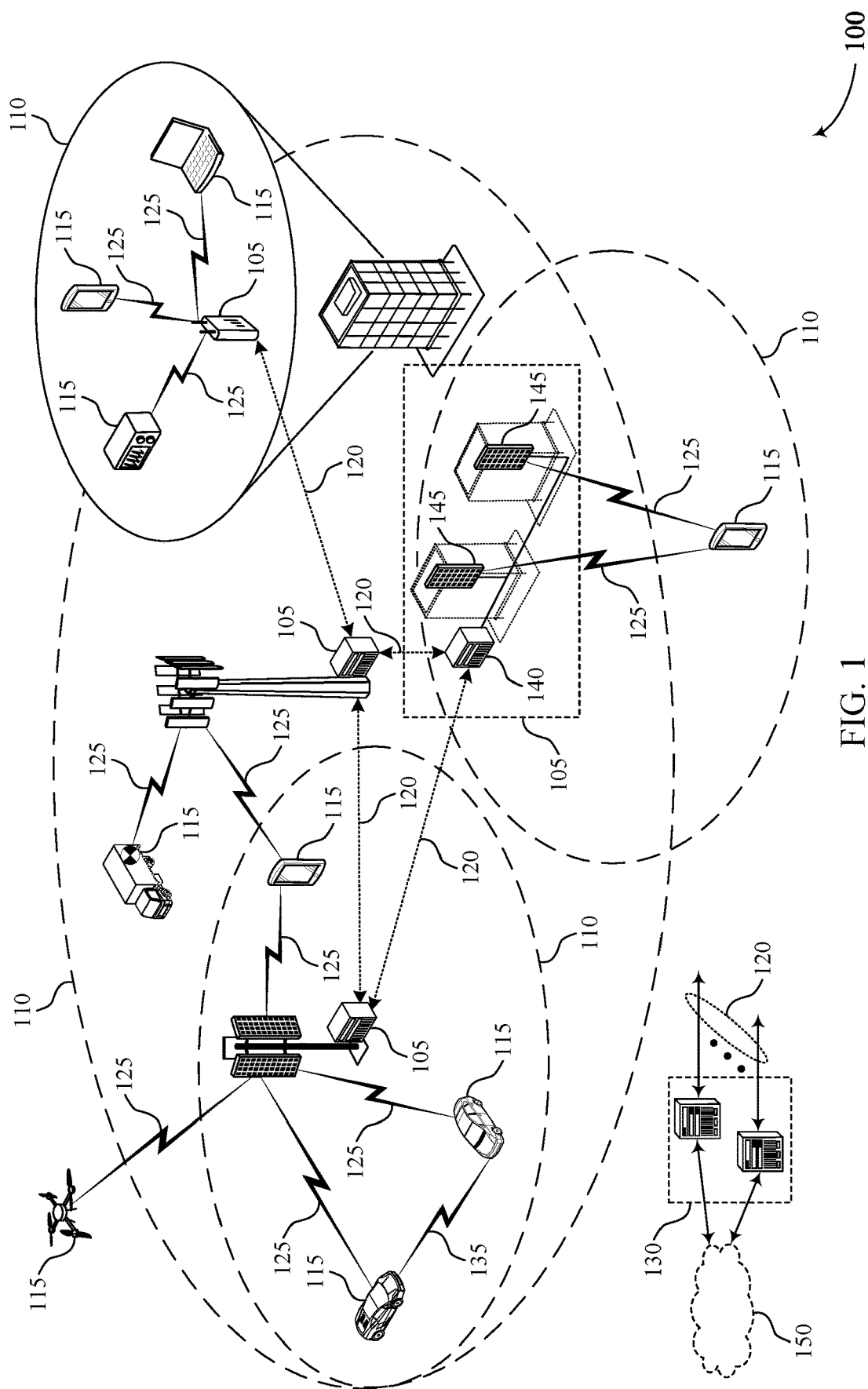
FIG. 1 illustrates an example of a wireless communications system that supports reporting for conditional primary secondary cell addition or change in accordance with aspects of the present disclosure.

FIG. 1 illustrates an example of a wireless communications system 100 that supports reporting for conditional primary secondary cell addition or change in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $\Delta_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC)

or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, a UE 115 may be configured with one or more configurations for one or more serving cell procedures. For example, the UE 115 may be configured with a configuration for a conditional procedure for adding or changing a PSCell. However, the reports (e.g., self-organizing network (SON) reports) sent by the UE 115 may not convey important information related to the conditional PSCell procedure, which may negatively impact the performance of the wireless communications system 100. According to the techniques described herein, a UE 115 may improve performance of the wireless communication system by sending reports with information related to the conditional PSCell procedure, among other information.

Figure 2:
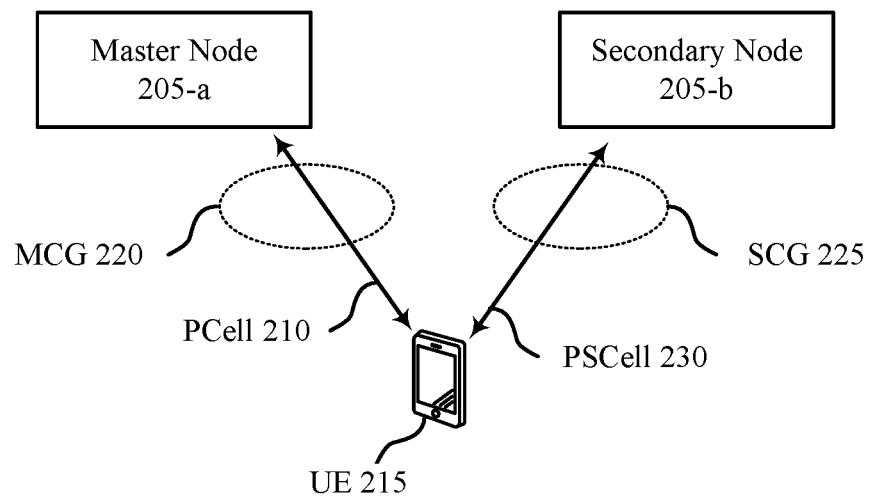
FIG. 2 illustrates an example of a wireless communications system that supports reporting for conditional primary secondary cell addition or change in accordance with aspects of the present disclosure.

FIG. 2 illustrates an example of a wireless communications system 200 that supports reporting for conditional primary secondary cell addition or change in accordance with aspects of the present disclosure. The wireless communications system 200 may include a master node 205-a, a secondary node 205-b, and a UE 215. The nodes 205 may be examples of radio access nodes such as base stations, eNBs, gNBs, and the like. The UE 215 may send reports (e.g., SON reports) with information related to a conditional procedure for adding or changing PSCells.

The UE 215 may support dual connectivity in which the UE 215 has concurrent connections with multiple nodes. For example, the UE 215 may have a connection with the master node 205-a via one or more serving cells and may simultaneously have a connection with the secondary node 205-b via one or more serving cells. In some examples, the UE 215 may support MR-DC (multi radio access technology (RAT) dual connectivity) in which the nodes 205 operate using different RATs. In some examples, the UE 215 may support EN-DC (E-UTRA-NR dual connectivity). In some examples, the UE 215 may support NE-DC (NR-E-UTRA dual connectivity). The UE 215 may also support other types of dual connectivity in addition to the types described herein.

The master node 205-a may be associated with one or more serving cells that make up the master cell group (MCG) 220. For example, the master node 205-a may be associated with a PCell 210, which may be used for initial access and other types of procedures, and optionally one or more secondary cells (SCells). The secondary node 205-b may also be associated with one or more serving cells that make up the secondary cell group (SCG) 225. For example, the master node 205-a may be associated with a PSCell 230, which may be used for initial access and other types of procedure, and optionally one or more SCells. In some examples the master node 205-a may provide the control plane connection to the core network and the secondary node 205-b may provide additional resources to the UE 215. In some examples, the master node 205-a and the secondary node 205-b operate using a same radio access technology (RAT); in other examples, the master node 205-a and the secondary node 205-b operate using different RATs (e.g., the master node 205-a may operate using a first RAT and the secondary node 205-b may operate using a second RAT). In some examples, a serving cell may be referred to as a component carrier or other suitable terminology.

The master node 205-a may send the UE 215 a configuration for a conditional PSCell procedure (e.g., a CPAC procedure) for adding or changing the PSCell 230. Unlike a configuration for a non-conditional procedure for adding or changing the PSCell, the configuration for the conditional PSCell procedure may be sent before communication conditions degrade at the PSCell. Rather than applying the configuration for the conditional PSCell procedure right away (which the UE 215 may do for a configuration for a non-conditional PSCell procedure), the UE 215 may store the configuration and wait to apply the configuration until one or more triggering conditions associated with the conditional PSCell procedure are satisfied.

In some examples, the master node 205-a may also send the UE 215 a configuration for a handover procedure for handing over (e.g., changing) the PCell (e.g., from a source master node to a target master node). For example, the master node 205-a may send the UE 215 a configuration for a conditional handover procedure (CHO) that is triggered by the satisfaction of one or more triggering conditions, a non-conditional handover procedure that is triggered by a command from the master node 205-a, or a Dual Active Protocol Stack (DAPS) handover procedure that involves simultaneous reception of user data from the source master node and the target master node, among other types of handover procedures.

According to the techniques described herein, the UE 215 may send a report with information related to the conditional PSCell procedure, the PCell procedure, or both, among other information. The information included in the report may be based on the type of serving cell (PCell and PSCell) procedures configured at the UE 215, the triggering order for the serving cell procedures, the failure/success status of the serving cell(s) (PCell and PSCell) procedure(s), the connection status of the serving cell(s) (PCell and PSCell), or a combination of these factors, among other factors.

A conditional PSCell procedure, such as a CPAC procedure, may be an example of a secondary node addition or change procedure. A secondary node change procedure may be initiated by the master node (e.g., the master node 205-a) or by the secondary node (e.g., the secondary node 205-b), whereas a secondary node additional procedure may be initiated by the master node.

Figure 3:
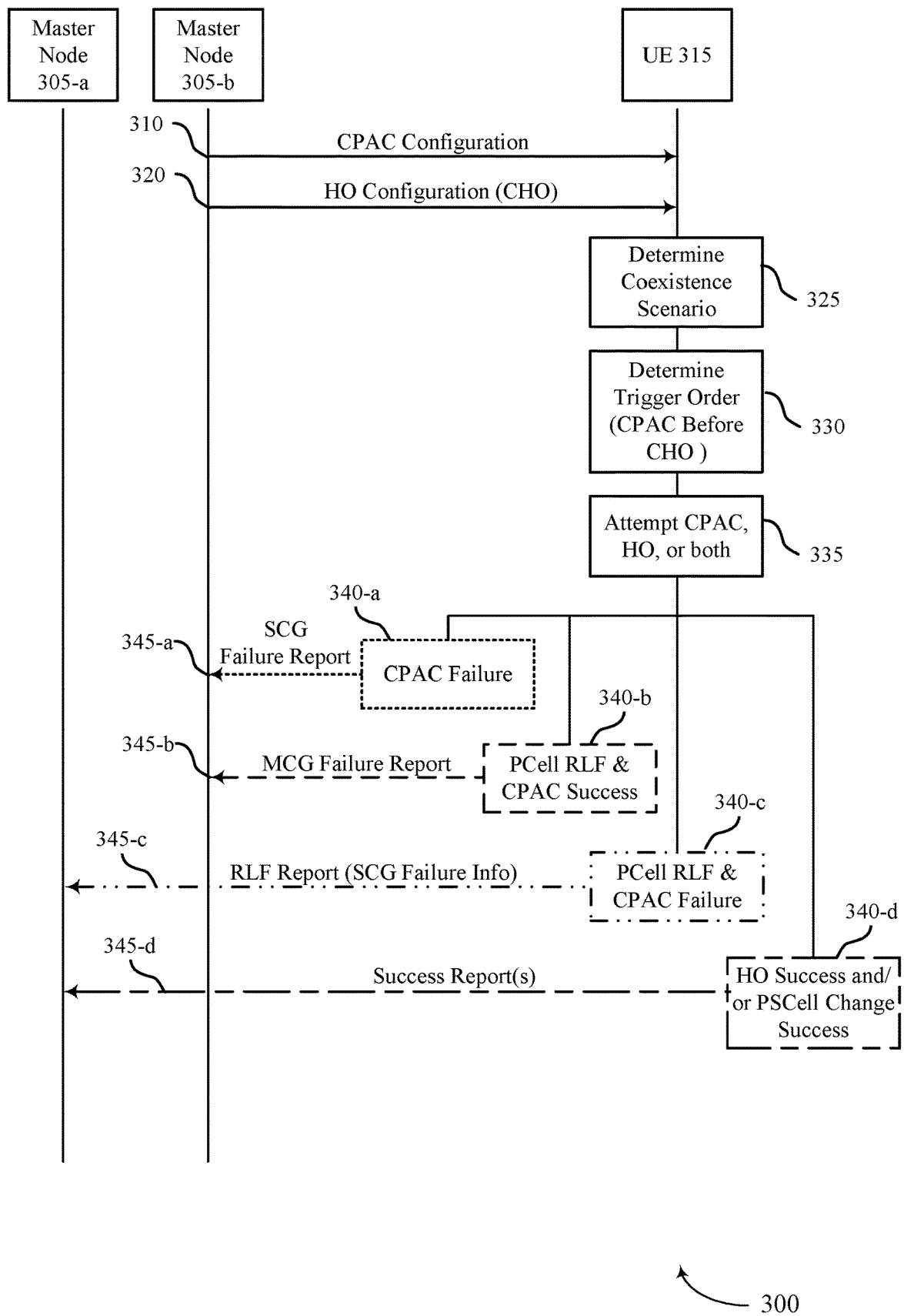
FIG. 3 illustrates an example of a process flow that supports reporting for conditional primary secondary cell addition or change in accordance with aspects of the present disclosure.

FIG. 3 illustrates an example of a process flow 300 that supports reporting for conditional primary secondary cell addition or change in accordance with aspects of the present disclosure. In some examples, the process flow 300 may be related to aspects of the wireless communications system 100 or the wireless communications system 200. For example, the process flow 300 may be implemented by a master node 305-a, a master node 305-b, and a UE 315, which may be examples of master nodes and a UE as described herein. The UE 315 may have dual connectivity with the master node 305-b (e.g., via a PCell, which may be associated with a MCG) and a secondary node (e.g., via a PSCell, which may be associated with a SCG). The process flow 300 may illustrate operations of the UE 315 when the UE 315 is configured with a configuration for a conditional procedure for adding or changing the PSCell (e.g., a CPAC procedure) and a configuration for a conditional handover procedure (e.g., CHO procedure) for the PCell. In particular, the process flow 300 may illustrate operations of the UE 315 when the CPAC procedure is triggered before the CHO procedure.

At 310, the master node 305 may transmit a configuration for a CPAC procedure (also referred to as a "CPAC configuration") to the UE 315. The configuration for the CPAC procedure may be conveyed via radio resource control (RRC) signaling, downlink control information (DCI), or a medium access control (MAC) control element (MAC-CE), among other options. The configuration for the CPAC procedure may be associated with one or more triggering conditions that, when satisfied, trigger performance (or at least an attempt) of the CPAC procedure. In some examples, the CPAC configuration may indicate one or more neighboring cells as candidate cells for the CPAC procedure.

At 320, the master node 305 may additionally transmit a configuration for a CHO procedure (also referred to as a "CHO configuration") to the UE 315. The CHO configuration may be conveyed via RRC signaling, DCI, or a MAC-CE, among other options. The CHO configuration may be associated with one or more triggering conditions that, when satisfied, trigger performance (e.g., an attempt, execution) of the CHO procedure. Thus, in some scenarios, the UE 315 may be configured for both a CPAC procedure and a CHO procedure.

At 325, the UE 315 may determine the coexistence scenario. For example, the UE 315 may determine the type of serving cell procedures with which the UE 315 is configured. In the given example, the UE 315 may determine that the UE 315 is configured for both a CPAC procedure and a CHO procedure. The coexistence of PCell and PSCell procedures or radio link status may influence the information included in different reports sent by the UE 315 at 345.

At 330, the UE 315 may determine the triggering order for the serving cell (e.g., the PCell, PSCell) procedures. For example, the UE 315 may determine that the CPAC procedure has been triggered before the CHO procedure (e.g., the CPAC procedure may be triggered first and the CHO procedure may be triggered second or may remain untriggered). The triggering order may influence the information included in different reports sent by the UE 315 at 345.

At 335, the UE 315 may attempt the CPAC procedure. The UE 315 may attempt the CPAC procedure based on one or more triggering conditions for the CPAC procedure being satisfied. In some examples, the UE 315 may also attempt a handover of the PCell (e.g., the UE 315 may attempt the CHO procedure or a non-conditional handover procedure for the PCell). For example, the UE 315 may attempt a handover of the PCell from the master node 305-b (e.g., the source master node) to the master node 305-a (e.g., the target master node).

The operations at 340-a through 340-d represent different outcomes of the CPAC procedure in the conjunction with PCell procedures and radio conditions, and the operations at 345-a through 345-d may be corresponding operations. Although shown being sent to a particular master node 305, the report(s) transmitted at 345 may be transmitted to one or more additional or alternative nodes.

In some examples, the report(s) sent at 345 may be an example of a SON report. In some examples, the information included in the report(s) sent at 345 may vary depending on how the UE 315 responds to the CPAC procedure triggering before the CHO procedure. In a first alternative (Alt. 1), the UE 315 may respond to the CPAC procedure triggering before the CHO procedure by applying the target PSCell configuration upon the triggering of the CPAC and discarding the configuration for the CHO procedure. Upon receiving a reconfiguration complete message, the master node 305 (e.g., the source master node) may perform handover cancelation with the target master node to release reserved resources for the UE 315 and the UE context. The remaining steps of the CPAC procedure may then be performed.

In a second alternative (Alt. 2), the UE 315 may respond to the CPAC procedure triggering before the CHO procedure by keeping, but not applying, the configuration for the CHO procedure (e.g., the UE 315 may refrain from performing measurements on target PCells). Upon receiving a reconfiguration complete message, the master node 305 (e.g., the source master node) may perform CHO procedure modification with the target master nodes and may update the CHO procedure configuration at the UE 315. The master node 305 may include the MR-DC configuration as the source configuration for the modified CHO procedure.

In a third alternative (Alt. 3), the UE 315 may respond to the CPAC procedure triggering before the CHO procedure by referencing the configuration for the CHO procedure to determine whether the UE 315 should keep or discard the CHO configuration when the CPAC is triggered. For example, if the MCG configuration in the target PSCell configuration includes only a secondary node key counter, the UE 315 may keep the CHO procedure configuration. As another example, if the CHO procedure configuration is a full configuration, the UE 315 may keep the CHO procedure configuration.

Although three distinct alternatives (Alt. 1 through Alt. 3) are described herein, combinations of these alternatives are contemplated and with the scope of the present disclosure, as are other alternatives not described herein.

At 340-a, the UE 315 may determine that the CPAC procedure has failed. In some examples, the CPAC procedure may fail without radio link failure (RLF) occurring at the PCell (e.g., the CPAC procedure may be a late CPAC procedure, an early CPAC procedure, or a CPAC procedure to the wrong PSCell). At 345-a, the UE 315 may transmit a report to a master node 305, such as the master node 305-b. The report may be sent based on the CPAC procedure failing and may indicate the CPAC procedure failure. In some examples, the report may be an SCG failure message such as an SCGFailureInformation message, an SCGFailureInformationNR message, an SCGFailureInformationEUTRA message, or the like. Thus, the report may include information about a failure of the SCG associated with the PSCell. In some examples, the SCG failure message may additionally or alternatively provide information about: SCG failure related to SCG radio link failure, failure of SCG reconfiguration with synchronization, SCG configuration failure for an RRC message on a signaling radio bearer (SRB), such as SRB3, an SCG integrity check failure, and/or consistent uplink listen-before-talk (LBT) failures on the PSCell (e.g., for operations in shared spectrum), among other failures. In some examples, the UE 215 may be prevented from transmitting the SCG failure message if radio link failure occurs at the MCG.

In some examples, the SCG failure message may be enhanced by sending measurement information for the frequencies of multiple RATs (or a RAT other than the RAT of the configuring node). For example, even if the serving SCG cell operates on NR carrier frequencies, upon SCG failure detection, or upon PSCell change or addition failure, or upon conditional PSCell addition or change failure, the UE 315 may report measurement information for EUTRA frequencies in addition to NR frequencies in the SCG failure message (e.g., an SCGFailureInformation message or an SCGFailureInformationNR message). In another example, even if the SCG cell operates on EUTRA frequencies, upon SCG failure detection, or upon PSCell change or addition failure, or upon conditional PSCell addition or change failure, the UE 315 may report measurement information for NR frequencies in addition to EUTRA frequencies in the SCG failure message (e.g., an SCGFailureInformationEUTRA message). Thus, a report for one RAT may include measurement information for frequencies of another RAT.

If the UE 315 implements the first alternative (Alt. 1), the second alternative (Alt. 2), the third alternative (Alt. 3), or a different alternative, the report transmitted at 345-a may include an explicit indication of whether the CPAC procedure or a non-conditional PSCell procedure was configured at the UE 315. Additionally or alternatively, the report transmitted at 345-a may include measurement information (e.g., radio resource management (RRM) measurement information) for the source PSCell, one or more candidate PSCells, the neighboring PSCell, or a combination thereof. In some examples (e.g., as part of neighboring cell measurements and irrespective of the PSCell measurement configured by the master node 305 or the secondary node), the report transmitted at 345-a may include an indication of whether the neighboring cells are candidate cells for the CPAC procedure. In some examples, the UE 315 may prioritize the measurement information for the candidate PSCells over other measurement information for inclusion in the report.

If the UE 315 implements the first alternative (Alt. 1), the second alternative (Alt. 2), the third alternative (Alt. 3), or a different alternative, the report transmitted at 345-*a* may additionally or alternatively include timing information related to the CPAC procedure. For example, the report transmitted at 345-*a* may indicate the duration (e.g., the time elapsed) between receipt of the CPAC configure and the CPAC procedure failing. In some examples, the UE 315 may reuse an existing timer (e.g., a timeConnfailure timer, which is related to a connection failure) as a best-effort. Additionally or alternatively, the UE 315 may indicate the duration between receipt of the CPAC configuration and executing the CPAC procedure. Additionally or alternatively, the UE 315 may indicate the duration between receipt of the CPAC configuration and a subsequent non-conditional PSCell addition procedure or change procedure. Additionally or alternatively, the report transmitted at 345-*a* may include the duration between two subsequent CPAC procedure failures.

If the UE 315 implements the first alternative (Alt. 1), the second alternative (Alt. 2), the third alternative (Alt. 3), or a different alternative, the report transmitted at 345-*a* may additionally or alternatively include condition information related to the CPAC procedure. For example, the report transmitted at 345-*a* may include a list of PSCells that met one or more of the triggering conditions for the CPAC procedure, potentially along with a list of the one or more triggering conditions. Additionally or alternatively, the report transmitted at 345-*a* may include an indication of whether a PSCell (e.g., a failed PSCell, a recovery PSCell, a reconnect PSCell) was a candidate PSCell for the CPAC procedure.

If the UE 315 implements the first alternative (Alt. 1), the second alternative (Alt. 2), the third alternative (Alt. 3), or a different alternative, the report transmitted at 345-*a* may additionally or alternatively include one or more reporting configurations (or reporting events) for the CPAC procedure. For example, the report transmitted at 345-*a* may include an indication of the A1 configuration, which may trigger the reporting for the CPAC procedure when the serving cell (e.g., the source PSCell) becomes better than a threshold. Additionally or alternatively, the report transmitted at 345-*a* may include an indication of the A3 configuration, which may trigger the reporting for the CPAC procedure when a neighboring cell becomes better than the serving cell by an offset. Additionally or alternatively, the report transmitted at 345-*a* may include an indication of the A5 configuration, which may trigger the reporting for the CPAC procedure when the serving cell becomes worse than a first threshold while a neighboring cell becomes better than a second threshold. Additionally or alternatively, the report transmitted at 345-*a* may include an indication of the B4 configuration, which may trigger the reporting for the CPAC procedure when one or more conditions are satisfied.

If the UE 315 implements the first alternative (Alt. 1), the second alternative (Alt. 2), the third alternative (Alt. 3), or a different alternative, the report transmitted at 345-*a* may additionally or alternatively include state information related to the PSCell. For example, the report transmitted at 345-*a* may include an indication of a state (e.g., an SCG state) of the source PSCell before receipt of the configuration for the CPAC procedure, before execution of the CPAC procedure, before receipt of a non-conditional PSCell addition or change command, before execution of a non-conditional PSCell addition or change command, or a combination thereof. Additionally or alternatively, the report transmitted at 345-*a* may include an indication of whether the PSCell was in an activated state or a deactivated state before receipt or execution, or both, of the CPAC procedure, a non-conditional PSCell addition or change procedure, or both. Additionally or alternatively, the report transmitted at 345-*a* may include an indication of whether the state of the PSCell was retained or modified (e.g., from the activated state to the deactivated state, or vice versa) during the CPAC procedure (or a non-conditional PSCell change procedure). Additionally or alternatively, the report transmitted at 345-*a* may include an indication of whether a state or status of the PSCell, the SCG, or both, was changed between receipt of the CPAC configuration and execution of the CPAC procedure (or receipt of a non-conditional PSCell addition or change command and execution of the non-conditional PSCell addition or change procedure).

As an alternative to 340-*a*, the UE 315 may, at 340-*b*, determine that radio link failure has been detected at the PCell, that the CPAC procedure has been successful, or both. In some examples, the UE 315 may determine detect radio link failure at the PCell before successful completion of a random access procedure at the target PSCell. At 345-*b*, the UE 315 may transmit a report to a master node 305, such as the master node 305-*b*, via secondary node upon the completion of the CPAC procedure to recover master node. The report may be sent based on the radio link failure at the master node 305-*b* and may indicate the radio link failure. In some examples, the report may be an RLF report (e.g., if fast MCG recovery is not supported at the UE 315). In some examples, the report may be an MCG failure message such as an MCGFailureInformation message (e.g., if fast MCG recovery is not supported at the UE 315). Thus, the report may include information about a failure of the MCG associated with the PCell.

If the UE 315 implements the first alternative (Alt. 1) or a different alternative, the report transmitted at 345-*b* may include an indication of whether the previously configured CHO configuration was discarded due to the CPAC procedure triggering. Additionally or alternatively, the report transmitted at 345-*b* may include an indication of the duration between receipt of the CHO configuration and the CPAC procedure triggering. Additionally or alternatively, the report transmitted at 345-*b* may include an indication of the duration between the CPAC procedure triggering and the radio link failure at the PCell. Additionally or alternatively, the report transmitted at 345-*b* may include measurement information for one or more PSCells (e.g., one or more candidate PSCells configured for the CPAC procedure).

If the UE 315 implements the second alternative (Alt. 2), the report transmitted at 345-*b* may include one or more of the parameters described with reference to the first alternative (Alt. 1). Additionally or alternatively, the report transmitted at 345-*b* may include an indication of a time difference between an earlier RRCReconfiguration message containing the CHO configuration and a modification command for the CHO configuration. If the UE 315 implements the second alternative (Alt. 3), the report transmitted at 345-*b* may include one or more of the parameters described with reference to the first alternative (Alt. 1).

As an alternative to 340-*a* and 340-*b*, the UE 315 may, at 340-*c*, determine that radio link failure has been detected at the PCell and that the CPAC procedure has also failed. At 345-*c*, the UE 315 may transmit a report to a master node 305, such as the master node 305-*a*. The report may be sent based on the PCell radio link failure, the CPAC procedure failure, or both and may indicate the radio link failure, the CPAC procedure failure, or both. In some examples, the report may be an RLF report and may include an SCG failure message or information from the SCG failure message as described herein.

If the UE 315 implements the first alternative (Alt. 1), the second alternative (Alt. 2), or the third alternative (Alt. 3), the report transmitted at 345-c may include one or more of the parameters discussed with reference to the report transmitted at 345-b. Additionally or alternatively, the report transmitted at 345-c may include one or more of the parameters discussed with reference to the report transmitted at 345-a.

As an alternative to 340-a, 340-b, and 340-c, the UE 315 may, at 340-d, determine that the handover procedure (e.g., the CHO procedure or the non-conditional handover procedure) has succeeded. Additionally or alternatively, the UE 315 may determine that the CPAC procedure has succeeded, that the PSCell has been successfully changed, or both. At 345-d, the UE 315 may transmit a report to a master node 305, such as the master node 305-a. The report may be sent based on the success(es) determined at 340-d and may indicate the success(es). In a first option (Option 1) (e.g., when there is a successful PSCell change and a successful PCell change), the report may be a PCell successful handover report that includes information about the CPAC procedure, the successful PCell handover, or both. In a second option (Option 2) (e.g., when there is a successful PSCell change without a PCell change), the report may be a successful PSCell change report that includes information about the CPAC procedure. In some examples, one or more triggers may be defined (e.g., by the network) for measurement logging for a successful CPAC procedure or non-conditional PSCell additional or change procedure (e.g., so that the UE 315 cay report lower layer issues during addition or changing of the PSCell).

In some examples, the report transmitted at 345-d may be transmitted based on one or more triggering conditions for the report. For example, the UE 315 may transmit the report at 345-d based on the T310 timer for the PSCell satisfying a threshold value (e.g., th1). The T310 timer for the PSCell may be a timer that starts upon detection of physical layer problems for the PSCell (e.g., upon a higher layer receiving a threshold quantity of consecutive out-of-sync indications from a lower layer). Additionally or alternatively, the UE 315 may transmit the report at 345-d based on the T310 timer for the PCell satisfying a threshold value (e.g., th2). The T310 timer for the PCell may be a timer that starts upon detection of physical layer problems for the PCell (e.g., upon a higher layer receiving a threshold quantity of consecutive out-of-sync indications from a lower layer). Additionally or alternatively, the UE 315 may transmit the report at 345-d based on the T312 timer for the PSCell satisfying a threshold value (e.g., th3). The T312 timer for the PSCell may be a timer that starts upon triggering a measurement report for a measurement identity for which the T312 timer has been configured while the T310 timer is running for the PSCell. Additionally or alternatively, the UE 315 may transmit the report at 345-d based on the T312 timer for the PCell satisfying a threshold value (e.g., th4). The T312 timer for the PCell may be a timer that starts upon triggering a measurement report for a measurement identity for which the T312 timer has been configured while the T310 timer is running for the PCell. Additionally or alternatively, the UE 315 may transmit the report at 345-d based on the T304 timer for the PSCell satisfying a threshold value (e.g., th5). The T304 timer for the PSCell may be a timer that starts upon 1) receiving the RRC Connection Reconfiguration message including the Mobility Control Information message, or 2) receiving the MobilityFromEUTRACommand message that includes a cell change order.

If the UE 315 implements the first alternative (Alt. 1) or a different alternative, the report transmitted at 345-d may include the identifier (ID) for the source PSCell (referred to as the source PSCell ID), the identifier for the target PSCell (referred to as the target PSCell ID), or both. Additionally or alternatively, the report transmitted at 345-d may include an indication of the state (e.g., the SCG state) of the source PSCell (e.g., the report may indicate whether the source PSCell was in an activated state or a deactivated state). Additionally or alternatively, the report transmitted at 345-d may include the duration of time the source PSCell spent in the state before the CPAC procedure (e.g., before the PSCell handover). Additionally or alternatively, the report transmitted at 345-d may include radio link management (RLM) results for the source PSCell while in the state. Additionally or alternatively, the report transmitted at 345-d may include an indication that radio link failure, a radio link failure issue, beam failure detection (BFD), a beam failure detection issue, or a combination thereof, has been detected. Additionally or alternatively, the report transmitted at 345-d may include measurement information (e.g., the latest radio measurements) of neighbor PSCells obtained before a PSCell change command was received (for either the CPAC procedure or a non-conditional PSCell procedure). Additionally or alternatively, the report transmitted at 345-d may include measurement information (e.g., the latest radio measurement) of the source PSCell, candidate PSCells, or both. Additionally or alternatively, the report transmitted at 345-d may include an indication of one or more reporting configurations (or reporting events) of candidate PSCells for the CPAC procedure. For example, the report transmitted at 345-d may indicate the A3 configuration or the A5 configuration, among other configurations. Additionally or alternatively, the report transmitted at 345-d may include a quality metric (e.g., a latest radio quality) of the source PCell. Additionally or alternatively, the report transmitted at 345-d may include an indication of whether a quality metric of the PCell has deteriorated during the CPAC procedure (or during a non-conditional PSCell procedure). Additionally or alternatively, the report transmitted at 345-d may include an indication of the duration between receipt of the CHO configuration and the CPAC procedure triggering. Additionally or alternatively, the report transmitted at 345-d may include an indication of the duration between the CPAC procedure triggering and detection of a lower layer issue at the PCell.

If the UE 315 implements the second alternative (Alt. 2), the report transmitted at 345-d may include one or more of the parameters described with reference to the first alternative (Alt. 1).

If the UE 315 implements the third alternative (Alt. 3), the report transmitted at 345-d may include one or more of the parameters described with reference to the first alternative (Alt. 1). Additionally or alternatively, the report transmitted at 345-d may include an indication of whether the configuration for the CHO procedure was discarded due to the CPAC procedure triggering. Additionally or alternatively, the report transmitted at 345-b may include an indication of the duration between the CPAC procedure triggering and the radio link failure at the PCell.

Different combinations of the parameters described herein may be included in the report transmitted at 345 and the combinations of parameters included in the report are not limited to those described herein. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 4:
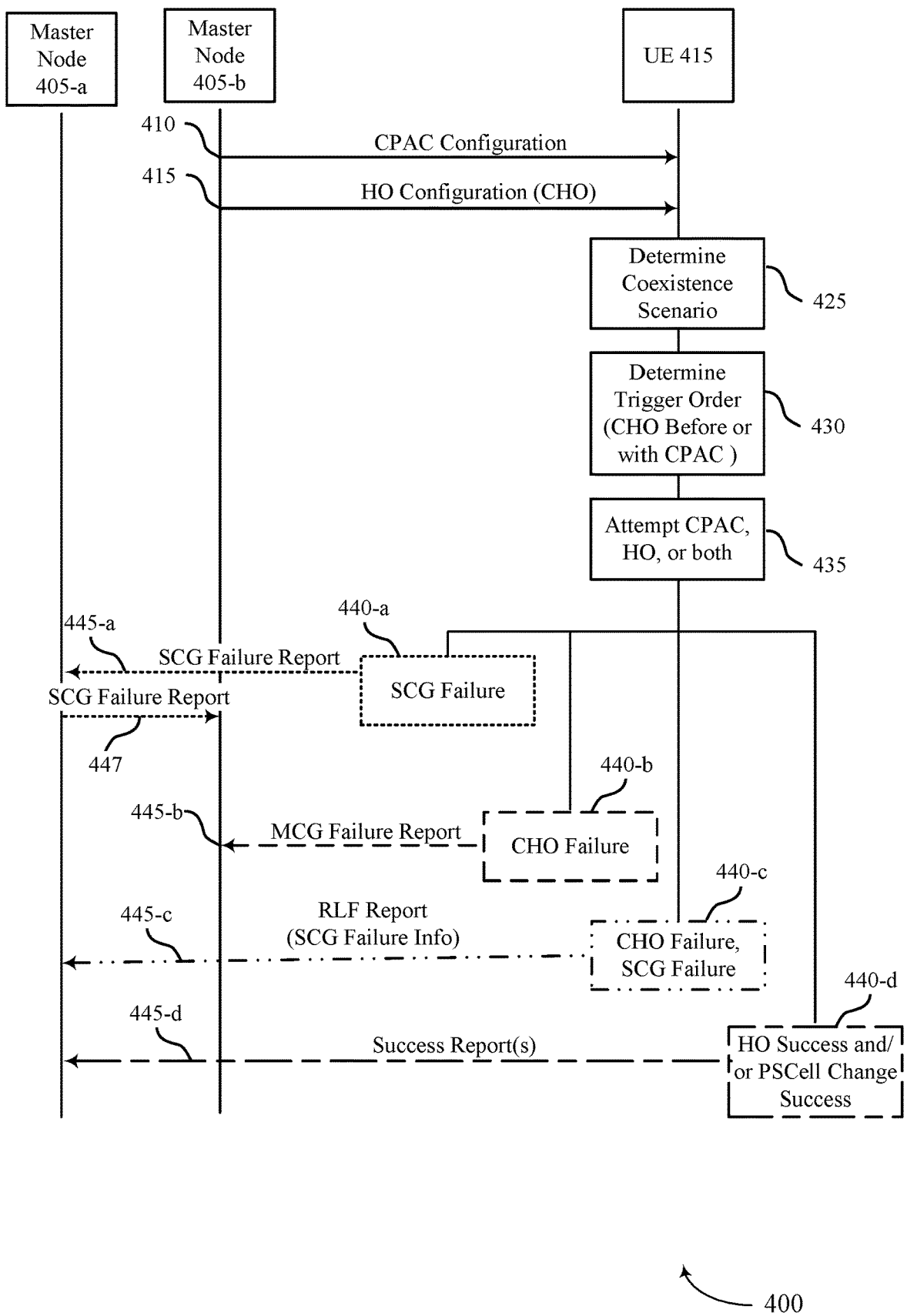
FIG. 4 illustrates an example of a process flow that supports reporting for conditional primary secondary cell addition or change in accordance with aspects of the present disclosure.

FIG. 4 illustrates an example of a process flow 400 that supports reporting for conditional primary secondary cell addition or change in accordance with aspects of the present disclosure. In some examples, the process flow 400 may be related to aspects of the wireless communications system 100 or the wireless communications system 200. For example, the process flow 400 may be implemented by a master node 405-*a*, a master node 405-*b*, and a UE 415, which may be examples of master nodes and a UE as described herein. The UE 415 may have dual connectivity with the master node 405-*b* (e.g., via a PCell, which may be associated with a MCG) and a secondary node (e.g., via a PSCell, which may be associated with a SCG). The process flow 400 may illustrate operations of the UE 415 when the UE 415 is configured with a configuration for a conditional procedure for adding or changing the PSCell (e.g., a CPAC procedure) and a configuration for a conditional handover procedure (e.g., CHO procedure) for the PCell. In particular, the process flow 400 may illustrate operations of the UE 415 when the CHO procedure is triggered before the CPAC procedure (a scenario that may be referred to as Case 2).

At 410, the master node 405-*b* may transmit a configuration for a CPAC procedure to the UE 415. The configuration for the CPAC procedure may be conveyed via RRC signaling, DCI, or a MAC-CE, among other options. The configuration for the CPAC procedure may be associated with one or more triggering conditions that, when satisfied, trigger performance (or at least an attempt) of the CPAC procedure. In some examples, the CPAC configuration may indicate one or more neighboring cells as candidate cells for the CPAC procedure. At 420, the master node 405-*b* may transmit a configuration for a CHO procedure to the UE 415. The CHO configuration may be conveyed via RRC signaling, DCI, or a MAC-CE, among other options. The CHO configuration may be associated with one or more triggering conditions that, when satisfied, trigger performance (e.g., an attempt, execution) of the CHO procedure. Thus, the UE 415 may be configured for both a CPAC procedure and a CHO procedure.

At 425, the UE 415 may determine the coexistence scenario. For example, the UE 415 may determine the type of serving cell (e.g., PCell or PSCell) procedures with which the UE 415 is configured. In the given example, the UE 415 may determine that the UE 415 is configured for both a CPAC procedure and a CHO procedure. The coexistence scenario may influence the information included in different reports sent by the UE 415 at 445. At 430, the UE 415 may determine the triggering order for the serving cell procedures. The triggering order may influence the information included in the report sent by the UE 415 at 445.

In the illustrated example, the UE 415 may determine that the CHO procedure has been triggered before the CPAC procedure (e.g., the CHO procedure may be triggered first and the CPAC procedure may be triggered second or may remain untriggered). Alternatively, the UE 415 may determine that the CHO procedure has been triggered together with (e.g., within a threshold amount of time of) the CPAC procedure. In either case, the CHO procedure may have priority of the CPAC procedure. In either case, the UE 415 may discard the CPAC configuration upon the triggering of the CHO procedure and application of the target PCell configuration (e.g., because the PCell has changed). Upon receiving a handover success message from the target master node (e.g., the master node 405-*a*), the source master node (e.g., the master node 405-*b*) may initiate a secondary node release procedure towards the target secondary node(s). The remaining steps of the CHO procedure may then be performed and completed.

At 435, the UE 415 may attempt the CHO procedure. The UE 415 may attempt the CHO procedure based on one or more triggering conditions for the CHO procedure being satisfied. In some examples, the UE 415 may also attempt to add a PSCell or change the PSCell (e.g., the UE 415 may attempt the CPAC procedure or a non-conditional PSCell additional or change procedure for the PSCell).

The operations at 440-*a* through 440-*d* may represent different outcomes of the CPAC procedure in conjunction with PCell procedure and radio conditions, and the operations at 445-*a* through 445-*d* may be corresponding operations. In some examples, the report(s) sent at 445 may be an example of a SON report. Although shown being sent to a particular master node 305, the report(s) transmitted at 445 may be transmitted to one or more additional or alternative nodes.

At 440-*a*, the UE 415 may determine that there has been an SCG failure during execution of the CHO procedure or after the CHO procedure has succeeded. For example, the UE 415 may detect radio link failure at the PSCell. At 445-*a*, the UE 415 may transmit a report to the master node 405-*a* (e.g., the target node). The report may be sent based on the SCG failure and may indicate the SCG failure. In some examples, the report may be an SCG failure message such as an SCGFailureInformation message, an SCGFailureInformationNR message, an SCGFailureInformationEUTRA message, or the like. Thus, the report may include information about a failure of the SCG associated with the PSCell. For example, the report transmitted at 445-*a* may include one or more of the parameters described with reference to the report transmitted at 345-*a* (referring to FIG. 3).

At 447, the master node 405-*a* may forward (e.g., relay) at least some of the information in the SCG failure report to the master node 405-*b* (e.g., the source node).

As an alternative to 440-*a*, the UE 415 may, at 440-*b*, determine that the CHO procedure has failed. At 445-*b*, the UE 415 may transmit a report to the master node 405-*b*. The report may be sent based on the CHO failure and may indicate the CHO failure. In some examples, the report may be an RLF report (e.g., if fast MCG recovery is not supported at the UE 415). In some examples, the report may be an MCG failure message such as an MCGFailureInformation message (e.g., if fast MCG recovery is supported at the UE 415). Thus, the report may include information about a failure of the MCG associated with the PCell. For example, the report transmitted at 445-*b* may include an indication of whether the previously configured CPAC configuration was discarded due to the CHO procedure triggering. Additionally or alternatively, the report transmitted at 445-*b* may include an indication of the duration between receipt of the CPAC configuration and the CHO procedure triggering. Additionally or alternatively, the report transmitted at 445-*b* may include an indication of the duration between the CHO procedure triggering and radio link failure (or SCG failure) at the PSCell. Additionally or alternatively, the report transmitted at 445-*b* may include measurement information for one or more PSCells (e.g., one or more candidate PSCells configured for the CPAC procedure).

As an alternative to 440-*a* and 440-*b*, the UE 415 may, at 440-*c*, determine that the CHO procedure has failed and that there has been a failure at the SCG. At 445-*c*, the UE 415 may transmit a report to a master node 405, such as the master node 405-*a*. The report may be sent based on the CHO procedure failure, the SCG failure, or both, and may indicate the CHO procedure failure, the SCG failure, or both. In some examples, the report may be an RLF report and may include an SCG failure message or information from the SCG failure message as described herein. Thus, the report transmitted at 445-*c* may include one or more parameters described with reference to the report transmitted at 345-*a* (referring to FIG. 3), one or more parameters described with reference to the report transmitted at 445-*b*, or both.

As an alternative to 440-*a*, 440-*b*, and 440-*c*, the UE 415 may, at 440-*d*, determine that the handover procedure (e.g., the CHO procedure or the non-conditional handover procedure) has succeeded. Additionally or alternatively, the UE 415 may determine that the CPAC procedure has succeeded, that the PSCell has been successfully changed, or both. At 445-*d*, the UE 415 may transmit a report to a master node 405, such as the master node 405-*a*. The report may be sent based on the success(es) determined at 440-*d* and may indicate the success(es). In a first option (Option 1) (e.g., when there is a successful PSCell change and a successful PCell change), the report may be a PCell successful handover report that includes information about the CPAC procedure, the successful PCell handover, or both. In a second option (Option 2) (e.g., when there is a successful PSCell change without a PCell change), the report may be a successful PSCell change report that includes information about the CPAC procedure. In some examples, the report transmitted at 445-*d* may be transmitted based on one or more triggering conditions for the report. For example, the UE 415 may transmit the report at 445-*d* based on one or more timers (e.g., the T304 timer(s), the T310 timer(s), the T312 timer(s) for the PSCell (or PCell) satisfying a threshold value.

The report transmitted at 445-*d* may include one or more parameters described with reference to the report transmitted at 345-*d* (referring to FIG. 3). Additionally or alternatively, the report transmitted at 445-*d* may include an indication of the duration between receipt of the CPAC configuration and the CHO procedure triggering. Additionally or alternatively, the report transmitted at 445-*d* may include the duration (e.g., time elapsed) between the CHO procedure triggering and detection of an issue (e.g., an SCG radio link management issue, a beam failure detection issue, a lower layer issue) at the PSCell.

Different combinations of the parameters described herein may be included in the report transmitted at 445 and the combinations of parameters included in the report are not limited to those described herein. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 5:
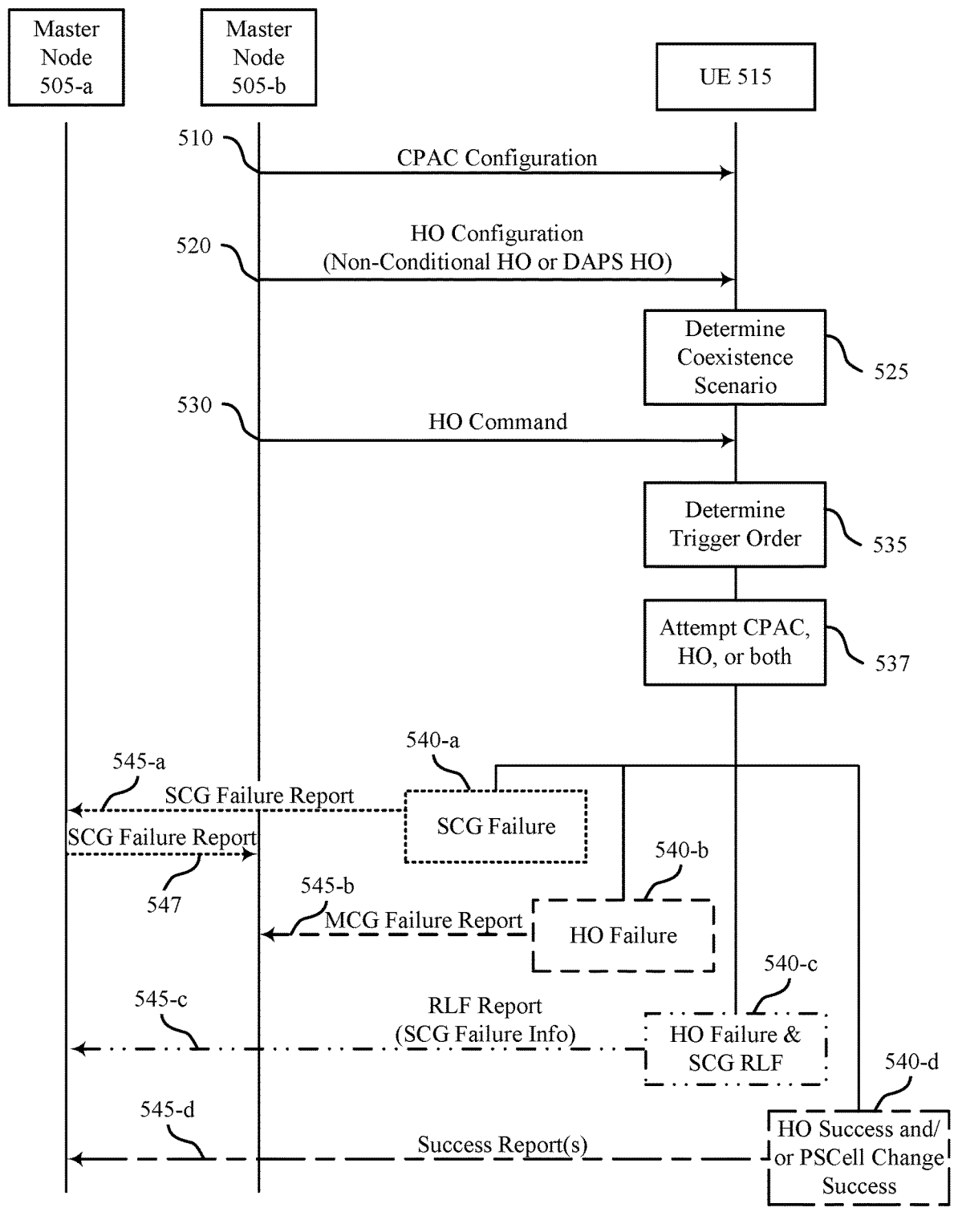
FIG. 5 illustrates an example of a process flow that supports reporting for conditional primary secondary cell addition or change in accordance with aspects of the present disclosure.

FIG. 5 illustrates an example of a process flow 500 that supports reporting for conditional primary secondary cell addition or change in accordance with aspects of the present disclosure. In some examples, the process flow 500 may be related to aspects of the wireless communications system 100 or the wireless communications system 200. For example, the process flow 500 may be implemented by a master node 505-*a*, a master node 505-*b*, and a UE 515, which may be examples of master nodes and a UE as described herein. The UE 515 may have dual connectivity with the master node 505-*b* (e.g., via a PCell, which may be associated with a MCG) and a secondary node (e.g., via a PSCell, which may be associated with a SCG). The process flow 500 may illustrate operations of the UE 515 when the UE 515 is configured with a configuration for a conditional procedure for adding or changing the PSCell (e.g., a CPAC procedure) and a configuration for a handover (HO) procedure (e.g., a non-conditional handover procedure, a DAPS handover procedure) for the PCell.

At 510, the master node 505-*b* may transmit a configuration for a CPAC procedure to the UE 515. The configuration for the CPAC procedure may be conveyed via RRC signaling, DCI, or a MAC-CE, among other options. The configuration for the CPAC procedure may be associated with one or more triggering conditions that, when satisfied, trigger performance (or at least an attempt) of the CPAC procedure. In some examples, the CPAC configuration may indicate on or more neighboring cells as candidate cells for the CPAC procedure. At 520, the master node 505-*b* may transmit a configuration for a handover procedure (also referred to as a handover configuration) to the UE 515. The handover configuration may be conveyed via RRC signaling, DCI, or a MAC-CE, among other options. The handover procedure may be a non-conditional handover procedure (e.g., a handover procedure for the PCell that is triggered by a command) or a DAPS handover procedure, among others. Thus, the UE 515 may be configured for both a CPAC procedure and a handover procedure.

At 525, the UE 515 may determine the coexistence scenario. For example, the UE 515 may determine the type of serving cell (e.g., PCell or PSCell) procedures with which the UE 515 is configured. In the given example, the UE 515 may determine that the UE 515 is configured for both a CPAC procedure and a handover procedure. The coexistence scenario may influence the information included in the report sent by the UE 515 at 545.

At 530, the UE 515 may receive a command for the handover procedure. For example, the command may be a trigger command that triggers the handover procedure for saving the PCell connectivity.

At 535, the UE 515 may determine the triggering order for the serving cell procedures. For example, in a first case (Case A) the UE 515 may determine that the CPAC procedure has been triggered (e.g., before the handover procedure) and that the master node 505-*b* has sent the handover command (e.g., after the CPAC procedure has been triggered). In such a case, the UE 515 may terminate the CPAC procedure, discard the CPAC configuration, and initiate the handover procedure at 537. In a second case (Case B), the UE 515 may determine that the CPAC procedure is configured but not triggered (e.g., before the handover procedure) and that the master node 505-*b* has sent the handover command (e.g., before the CPAC procedure has been triggered). In such a case, the UE 515 may discard the CPAC configuration and initiate the handover procedure at 537. The triggering order may influence at least some of the information included in the report sent by the UE 515 at 545.

At 537, the UE 515 may attempt the handover procedure. For example, the UE 515 may attempt the handover procedure with the master node 505-*b* as the source node and the master node 505-*a* as the target node. The UE 515 may attempt the handover procedure based on the handover command received at 530, based on one or more triggering conditions for the handover procedure being satisfied, or both. In some examples, the UE 515 may also attempt to add a PSCell or change the PSCell (e.g., the UE 515 may attempt the CPAC procedure or a non-conditional PSCell additional or change procedure for the PSCell).

The operations at 540-*a* through 540-*d* may be represent different outcomes of the CPAC procedure in conjunction with PCell procedures and radio conditions, and the operations at 545-*a* through 545-*d* may be corresponding operations. In some examples, the report(s) sent at 545 may be an example of a SON report. Although shown being sent to a particular master node 505, the report(s) transmitted at 545 may be transmitted to one or more additional or alternative nodes.

At 540-*a*, the UE 515 may determine that the SCG has failed. For example, the UE 515 may determine that radio link failure has occurred at the PSCell during the handover procedure or after successfully completing the handover procedure. At 545-*a* (e.g., after successfully completing the handover procedure), the UE 515 may transmit a report to the master node 505-*a* (e.g., the target node). The report may be sent based on the SCG failure and may indicate the SCG failure. In some examples, the report may be an SCG failure message such as an SCGFailureInformation message, an SCGFailureInformationNR message, an SCGFailureInformationEUTRA message, or the like. Thus, the report may include information about a failure of the SCG associated with the PSCell. For example, the report transmitted at 545-*a* may include one or more of the parameters described with reference to the report transmitted at 345-*a* (referring to FIG. 3).

At 547, the master node 505-*a* may forward (e.g., relay) at least some of the information in the SCG failure report to the master node 505-*b* (e.g., the source node).

As an alternative to 540-*a*, the UE 515 may, at 540-*b*, determine that the handover procedure for the PCell has failed. At 545-*b*, the UE 515 may transmit a report to the master node 505-*b*. The report may be sent based on the handover failure and may indicate the handover failure. In some examples, the report may be an RLF report (e.g., if fast MCG recovery is not supported at the UE 515). In some examples, the report may be an MCG failure message such as an MCGFailureInformation message (e.g., if the fast MCG recovery is supported at the UE 515). Thus, the report may include information about a failure of the MCG associated with the PCell. For example (e.g., for either Case A or Case B), the report transmitted at 545-*b* may include an indication of whether the configured CPAC procedure was configured before receipt of the handover command at 530. Additionally or alternatively (e.g., for Case A), the report transmitted at 545-*b* may include an indication of the duration between triggering of the CPAC procedure and receipt of the handover command. Additionally or alternatively (e.g., for Case B), the report transmitted at 545-*b* may include a duration between receipt of a reconfiguration command (e.g., an RRCreconfiguration message) for the PSCell and radio link failure at the PSCell. Additionally or alternatively (e.g., for Case A or Case B), the report transmitted at 545-*b* may include measurement information for the source PSCell, the target PSCell, one or more neighbor PSCells, or a combination thereof. Additionally or alternatively (e.g., for Case A), the report transmitted at 545-*b* may include an identifier for the PSCell (e.g., the PSCell identity) for which the CPAC procedure was triggered.

As an alternative to 540-*a* and 540-*b*, the UE 515 may, at 540-*c*, determine that the handover procedure has failed and that there has been a failure (e.g., radio link failure) at the SCG. At 545-*c*, the UE 515 may transmit a report to a master node 505, such as the master node 505-*a* (e.g. a new master node upon successful connection reestablishment or reconnect). The report may be sent based on the handover procedure failure, the SCG failure, or both, and may indicate the handover procedure failure, the SCG failure, or both. In some examples, the report may be an RLF report and may include an SCG failure message or information from the SCG failure message as described herein. Thus, the report transmitted at 545-*c* may include one or more parameters described with reference to the report transmitted at 345-*a* (referring to FIG. 3), one or more parameters described with reference to the report transmitted at 545-*b*, or both.

As an alternative to 540-*a*, 540-*b*, and 540-*c*, the UE 515 may, at 540-*d*, determine that the handover procedure has succeeded. Additionally or alternatively, the UE 515 may determine that the CPAC procedure has succeeded, that the PSCell has been successfully changed, or both. At 545-*d*, the UE 515 may transmit a report to a master node 505, such as the master node 505-*a* (e.g. target master node) or the master node 505-*b* (e.g., the source master node). The report may be sent based on the success(es) determined at 540-*d* and may indicate the success(es). In a first option (Option 1) (e.g., when there is a successful PSCell change and a successful PCell change), the report may be a PCell successful handover report that includes information about the CPAC procedure, the successful PCell handover, or both. In a second option (Option 2) (e.g., when there is a successful PSCell change without a PCell change), the report may be a successful PSCell change report that includes information about the CPAC procedure, the PSCell. In some examples, the report transmitted at 545-*d* may be transmitted based on one or more triggering conditions for the report. For example, the UE 515 may transmit the report at 545-*d* based on one or more timers (e.g., the T304 timer(s), the T310 timer(s), the T312 timer(s) for the PSCell (or PCell) satisfying a threshold value.

The report transmitted at 545-*d* may include one or more parameters described with reference to the report transmitted at 345-*d* (referring to FIG. 3). Additionally or alternatively, the report transmitted at 545-*d* may include one or more of the parameters described with reference to the report transmitted at 545-*b*. For example (e.g., for Case A or Case B), the report transmitted at 545-*d* may include an indication of the duration between triggering of the CPAC procedure and receipt of the handover command. Additionally or alternatively (e.g., for Case A or Case B), the report transmitted at 545-*d* may include measurement information for the source PSCell, the target PSCell, one or more neighbor PSCells, or a combination thereof. Additionally or alternatively (e.g., for Case A), the report transmitted at 545-*b* may include an identifier for the PSCell (e.g., the PSCell identity) for which the CPAC procedure was triggered. Additionally or alternatively (e.g., for Case B), the report transmitted at 545-*b* may include a duration between receipt of a reconfiguration command (e.g., an RRCreconfiguration message) for the PSCell and radio link failure at the PSCell.

Different combinations of the parameters described herein may be included in the report transmitted at 545 and the combinations of parameters included in the report are not limited to those described herein. Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 6:
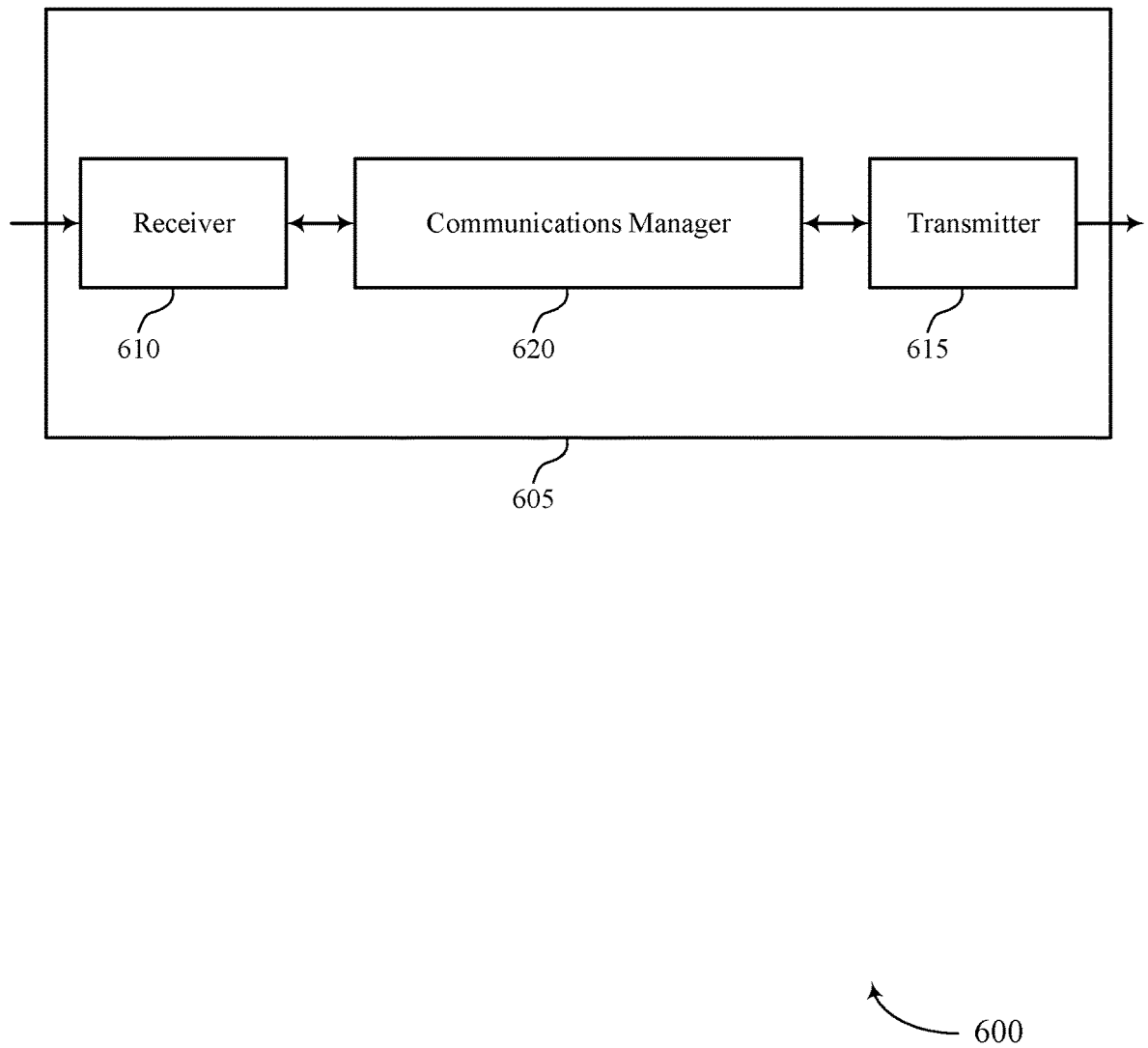
FIGS. 6 and 7 show block diagrams of devices that support reporting for conditional primary secondary cell addition or change in accordance with aspects of the present disclosure.

FIG. 6 shows a block diagram 600 of a device 605 that supports reporting for conditional primary secondary cell addition or change in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reporting for conditional primary secondary cell addition or change). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reporting for conditional primary secondary cell addition or change). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of reporting for conditional primary secondary cell addition or change as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving, from a master node associated with a primary cell, a configuration for a conditional procedure for adding or changing a primary secondary cell associated with a secondary node. The communications manager 620 may be configured as or otherwise support a means for receiving, from the master node, a configuration for a handover procedure for the primary cell. The communications manager 620 may be configured as or otherwise support a means for transmitting a report including information related to the conditional procedure, information related to the primary secondary cell, or both, based on a triggering order between the conditional procedure and the handover procedure.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improved communications, more efficient utilization of communication resources, improved coordination between devices, and improved utilization of processing capability.

Figure 7:
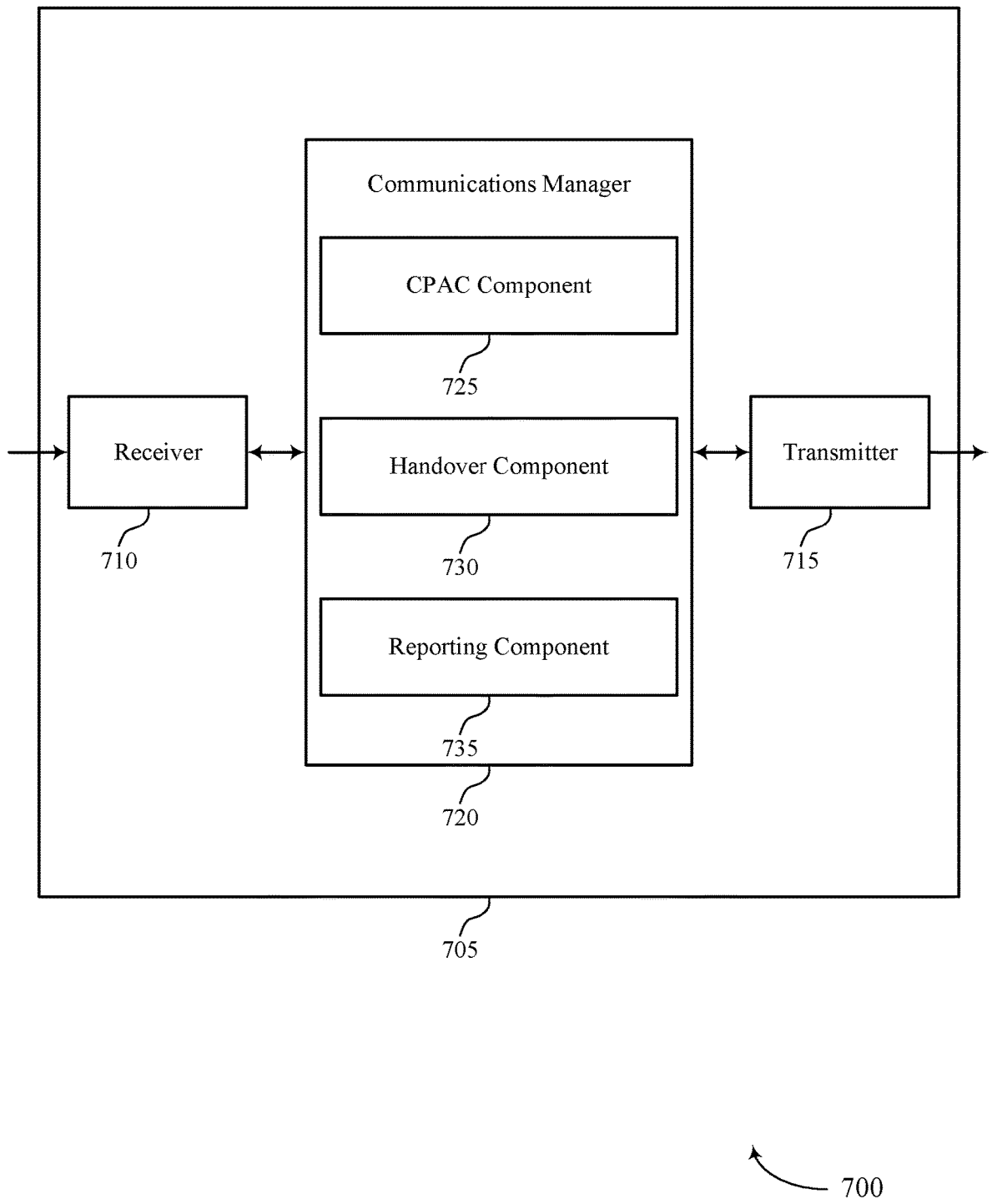

FIG. 7 shows a block diagram 700 of a device 705 that supports reporting for conditional primary secondary cell addition or change in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to reporting for conditional primary secondary cell addition or change). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to reporting for conditional primary secondary cell addition or change). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of reporting for conditional primary secondary cell addition or change as described herein. For example, the communications manager 720 may include a CPAC component 725, a handover component 730, a reporting component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The CPAC component 725 may be configured as or otherwise support a means for receiving, from a master node associated with a primary cell, a configuration for a conditional procedure for adding or changing a primary secondary cell associated with a secondary node. The handover component 730 may be configured as or otherwise support a means for receiving, from the master node, a configuration for a handover procedure for the primary cell. The reporting component 735 may be configured as or otherwise support a means for transmitting a report including information related to the conditional procedure, information related to the primary secondary cell, or both, based on a triggering order between the conditional procedure and the handover procedure.

Figure 8:
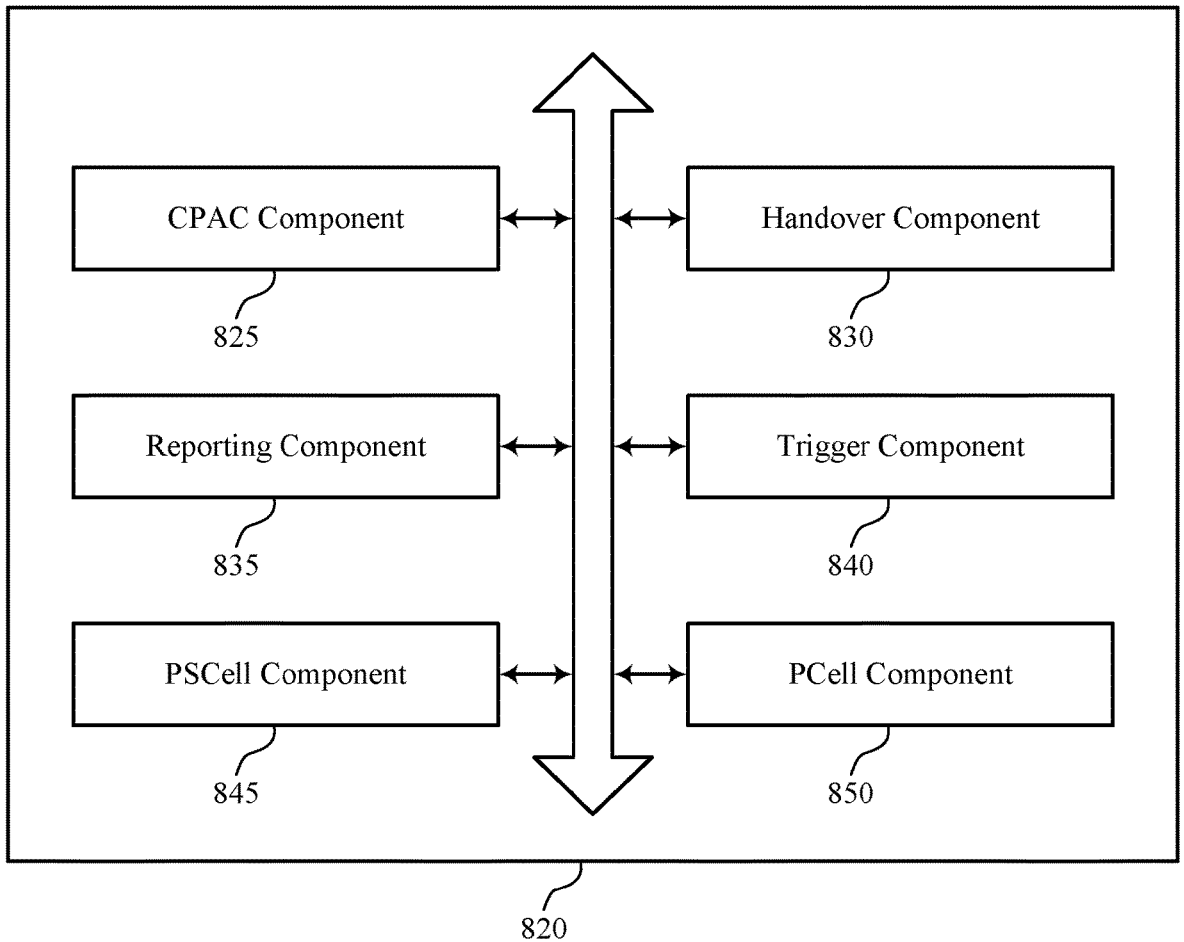
FIG. 8 shows a block diagram of a communications manager that supports reporting for conditional primary secondary cell addition or change in accordance with aspects of the present disclosure.

FIG. 8 shows a block diagram 800 of a communications manager 820 that supports reporting for conditional primary secondary cell addition or change in accordance with aspects of the present disclosure. The communications manager 820 may be an example of aspects of a communications manager 620, a communications manager 720, or both, as described herein. The communications manager 820, or various components thereof, may be an example of means for performing various aspects of reporting for conditional primary secondary cell addition or change as described herein. For example, the communications manager 820 may include a CPAC component 825, a handover component 830, a reporting component 835, a trigger component 840, a PSCell component 845, a PCell component 850, or any combination thereof. Each of these components may communicate, directly or indirectly, with one another (e.g., via one or more buses).

The communications manager 820 may support wireless communication at a UE in accordance with examples as disclosed herein. The CPAC component 825 may be configured as or otherwise support a means for receiving, from a master node associated with a primary cell, a configuration for a conditional procedure for adding or changing a primary secondary cell associated with a secondary node. The handover component 830 may be configured as or otherwise support a means for receiving, from the master node, a configuration for a handover procedure for the primary cell. The reporting component 835 may be configured as or otherwise support a means for transmitting a report including information related to the conditional procedure, information related to the primary secondary cell, or both, based on a triggering order between the conditional procedure and the handover procedure.

In some examples, the handover procedure includes a conditional handover procedure, and the trigger component 840 may be configured as or otherwise support a means for determining that the conditional procedure is triggered before the conditional handover procedure, where the report is transmitted to the master node based on determining that the conditional procedure is triggered before the conditional handover procedure.

In some examples, the PSCell component 845 may be configured as or otherwise support a means for determining that the conditional procedure has failed, where the report indicates the conditional procedure failure. In some examples, the reporting component 835 may be configured as or otherwise support a means for including in the report, based on determining that the conditional procedure has failed, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

In some examples, the measurement information includes measurement information for the primary secondary cell, measurement information for a target primary secondary cell, or both, measurement information for one or more neighboring cells, an indication of whether the one or more neighboring cells are candidate cells for the conditional PSCell procedure, or a combination thereof. In some examples, the report is for a first radio access technology and the measurement information includes measurement information for frequencies for a second radio access technology different than the first radio access technology.

In some examples, the timing information includes a duration between receiving the configuration for the conditional procedure and the conditional procedure failing, a duration between receiving the configuration for the conditional procedure and attempting the conditional procedure, a duration between receiving the configuration for the conditional procedure and attempting a non-conditional procedure for adding or changing the primary secondary cell, a duration between the failed conditional procedure and a second failed conditional procedure, or a combination thereof.

In some examples, the condition information includes a list of primary secondary cells that have met a set of conditions for triggering the conditional procedure, and indication of whether a target primary secondary cell was a candidate cell for the conditional procedure, or a combination thereof. In some examples, the state information includes an indication of a state of the primary secondary cell before reception of the configuration for the conditional procedure, an indication of the state of the primary secondary cell before attempting the conditional procedure, an indication of whether the state of the primary secondary cell was changed during the conditional procedure, an indication of whether a state of the primary secondary cell was changed between reception of the configuration for the conditional procedure and attempting the conditional procedure, or a combination thereof.

In some examples, the PCell component 850 may be configured as or otherwise support a means for determining radio link failure at the primary cell during the conditional procedure, where the report indicates the radio link failure and is transmitted to the master node based on the determining the radio link failure. In some examples, the reporting component 835 may be configured as or otherwise support a means for including in the report, based on determining the radio link failure, an indication of whether the configuration for the conditional handover procedure was discarded based on the conditional procedure triggering, an indication of a duration between receiving the configuration for the conditional handover procedure and the conditional procedure triggering, an indication of a duration between the conditional procedure triggering and the radio link failure, an indication of a duration between receiving the configuration for the conditional handover procedure and receiving a command modifying the conditional handover procedure, measurement information for the primary secondary cell, or a combination thereof.

In some examples, the PSCell component 845 may be configured as or otherwise support a means for determining that the conditional procedure has failed, where the report indicates the conditional procedure failure. In some examples, the reporting component 835 may be configured as or otherwise support a means for including in the report, based on the conditional procedure failing, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

In some examples, the PSCell component 845 may be configured as or otherwise support a means for determining that the conditional procedure was successful, the conditional handover procedure was successful, or both. In some examples, the reporting component 835 may be configured as or otherwise support a means for including in the report, based on the conditional procedure being successful, the conditional handover procedure being successful, or both, an identifier of the primary secondary cell, an identifier of a target primary secondary cell, a state of the primary secondary cell, an indication of a duration of time the primary secondary cell was in the state before the conditional procedure, or a combination thereof.

In some examples, the reporting component 835 may be configured as or otherwise support a means for including in the report one or more of radio link management results for the primary secondary cell, an indication of whether a radio link management issue or beam failure detection issue for the primary secondary cell has been detected, measurement information obtained for neighboring primary secondary cells before the configuration for the conditional procedure was received, measurement information obtained for the primary secondary cell, for candidate primary secondary cells for the conditional procedure, or a combination thereof, an indication of triggering conditions for the candidate primary secondary cells, a radio quality metric for the primary secondary cell, an indication of whether a radio quality metric for the primary secondary cell has deteriorated during the conditional procedure, or a combination thereof, an indication of a duration between receiving the configuration for the conditional handover procedure and the conditional procedure triggering, an indication of a duration between the conditional procedure triggering and detecting a lower layer issue at the primary cell, or an indication of a duration between the conditional procedure triggering and radio link failure at the primary cell.

In some examples, the trigger component 840 may be configured as or otherwise support a means for determining a triggering condition for the report is satisfied, where the triggering condition includes a timer for the primary secondary cell satisfying a first threshold, a timer for the primary cell satisfying a second threshold, or a combination thereof, and where the report is transmitted based on the triggering condition being satisfied.

In some examples, the handover procedure includes a conditional handover procedure, and the trigger component 840 may be configured as or otherwise support a means for determining that the conditional handover procedure is triggered before, or concurrently with, the conditional procedure, where the report is transmitted to the master node based on the determination.

In some examples, the PSCell component 845 may be configured as or otherwise support a means for determining radio link failure at the primary secondary cell during the conditional handover procedure, where the report indicates the radio link failure. In some examples, the reporting component 835 may be configured as or otherwise support a means for including in the report, based on determining the radio link failure, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

In some examples, the PCell component 850 may be configured as or otherwise support a means for determining that the conditional handover procedure has failed, where the report indicates the conditional handover procedure failure. In some examples, the reporting component 835 may be configured as or otherwise support a means for including in the report, based on determining that the conditional handover procedure has failed, an indication of whether the configuration for the conditional procedure was discarded based on the conditional handover procedure triggering, an indication of a duration between receiving the configuration for the conditional procedure and the conditional handover procedure triggering, an indication of a duration between the conditional handover procedure triggering and radio link failure at the primary secondary cell, measurement information for the primary secondary cell, or a combination thereof.

In some examples, the PSCell component 845 may be configured as or otherwise support a means for determining radio link failure at the primary secondary cell, where the report indicates the radio link failure. In some examples, the reporting component 835 may be configured as or otherwise support a means for including in the report, based on the determining the radio link failure, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

In some examples, the PSCell component 845 may be configured as or otherwise support a means for determining that the conditional procedure was successful, the conditional handover procedure was successful, or both. In some examples, the reporting component 835 may be configured as or otherwise support a means for including in the report, based on the conditional procedure being successful, the conditional handover procedure being successful, or both, an identifier of the primary secondary cell, an identifier of a target primary secondary cell, a state of the primary secondary cell, an indication of a duration of time the primary secondary cell was in the state before the conditional procedure, or a combination thereof.

In some examples, the reporting component 835 may be configured as or otherwise support a means for including in the report one or more of radio link management results for the primary secondary cell, an indication of whether a radio link management issue or beam failure detection issue for the primary secondary cell has been detected, measurement information obtained for neighboring primary secondary cells before the configuration for the conditional procedure was received, measurement information obtained for the primary secondary cell, for candidate primary secondary cells for the conditional procedure, or a combination thereof, an indication of triggering conditions for the candidate primary secondary cells, a radio quality metric for the primary secondary cell, an indication of whether a radio quality metric for the primary secondary cell has deteriorated during the conditional procedure, or a combination thereof, an indication of a duration between receiving the configuration for the conditional procedure and the conditional handover procedure triggering, or an indication of a duration between the conditional handover procedure triggering and detecting a radio link issue, a beam failure issue, or a lower layer issue at the primary cell.

In some examples, the handover procedure includes a non-conditional handover procedure or a DAPS handover procedure, and the trigger component 840 may be configured as or otherwise support a means for determining whether the conditional procedure is triggered before receipt of a command triggering the handover procedure, where the report is transmitted based on the determination.

In some examples, the PSCell component 845 may be configured as or otherwise support a means for determining radio link failure at the primary secondary cell during the handover procedure, where the report indicates the radio link failure. In some examples, the reporting component 835 may be configured as or otherwise support a means for including in the report, based on determining the radio link failure, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

In some examples, the PCell component 850 may be configured as or otherwise support a means for determining that the handover procedure has failed, where the report indicates the handover procedure failure. In some examples, the reporting component 835 may be configured as or otherwise support a means for including in the report, based on determining that the handover procedure failed, an indication of whether the configuration for the conditional procedure was received before the command triggering the handover procedure, an indication of a duration between triggering the conditional procedure and receipt of the command triggering the handover procedure, an indication of a duration between receiving the configuration for the conditional procedure and determining radio link failure at the primary secondary cell, measurement information for the primary secondary cell, measurement information for a target primary secondary cell, measurement information for one or more neighboring cells, an identifier of the primary secondary cell, an identifier of the target primary secondary cell, or a combination thereof.

In some examples, the PSCell component 845 may be configured as or otherwise support a means for determining radio link failure at the primary secondary cell, where the report indicates the radio link failure. In some examples, the reporting component 835 may be configured as or otherwise support a means for including an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

In some examples, the PSCell component 845 may be configured as or otherwise support a means for determining that the conditional procedure was successful, the handover procedure was successful, or both. In some examples, the reporting component 835 may be configured as or otherwise support a means for including in the report, based on the conditional procedure being successful, the handover procedure being successful, or both, an identifier of the primary secondary cell, an identifier of a target primary secondary cell, a state of the primary secondary cell, an indication of a duration of time the primary secondary cell was in the state before the conditional procedure, or a combination thereof.

In some examples, the reporting component 835 may be configured as or otherwise support a means for including in the report one or more of radio link management results for the primary secondary cell, an indication of whether a radio link management issue or beam failure detection issue for the primary secondary cell has been detected, measurement information obtained for neighboring primary secondary cells before the configuration for the conditional procedure was received, measurement information obtained for the primary secondary cell, for the target primary secondary cell, for candidate primary secondary cells for the conditional procedure, for one or more neighboring cells, or a combination thereof, an indication of triggering conditions for the candidate primary secondary cells, a radio quality metric for the primary secondary cell, an indication of whether a radio quality metric for the primary secondary cell has deteriorated during the conditional procedure, or a combination thereof, an indication of a duration between the conditional procedure triggering and receiving the command triggering the handover procedure, an indication of a duration between receiving the configuration for the conditional procedure and radio link failure at the primary cell, or an identity (e.g., identifier) of the primary secondary cell, an identity (e.g., identifier) of the target primary secondary cell, or a combination thereof.

Figure 9:
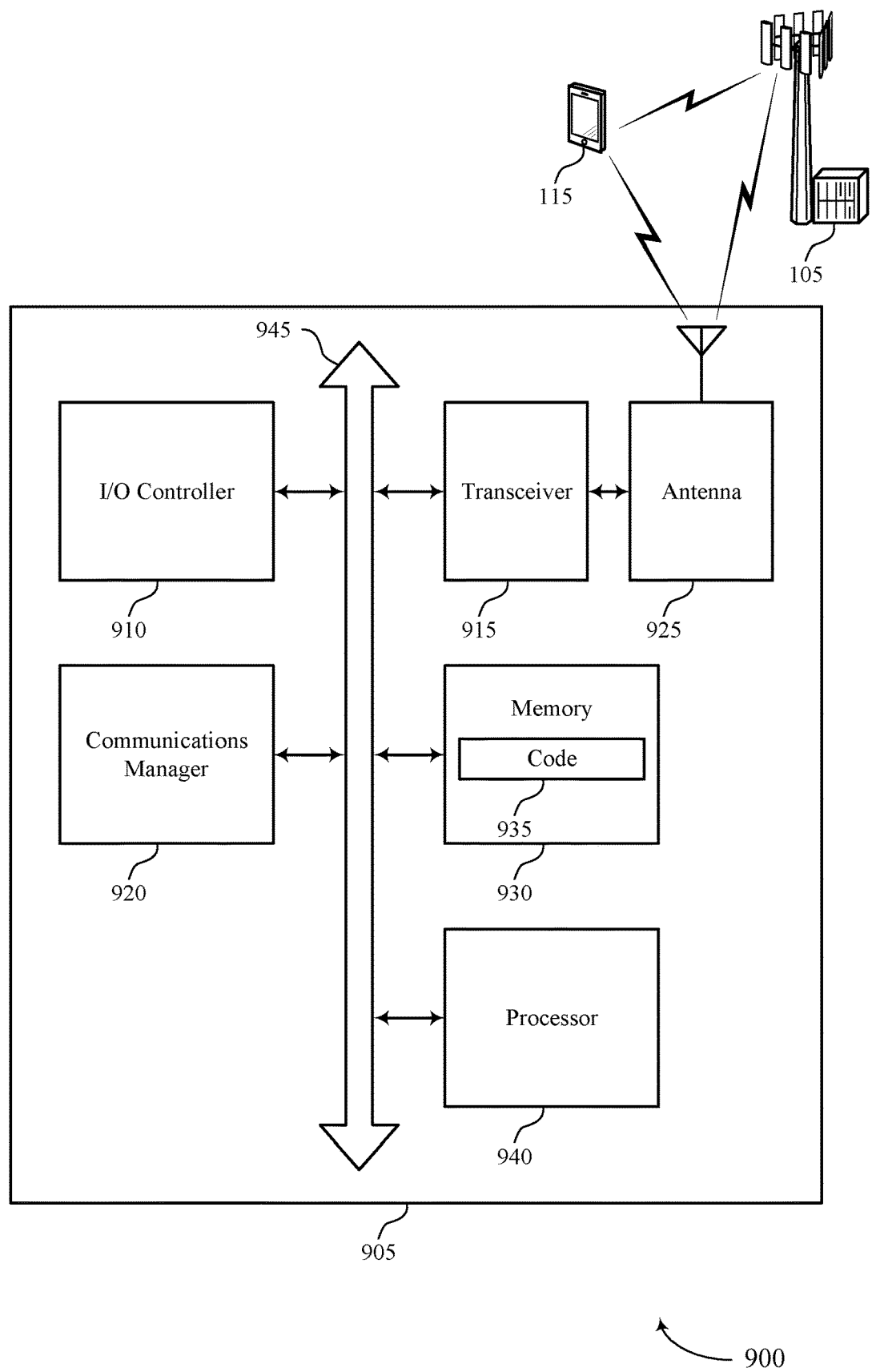
FIG. 9 shows a diagram of a system including a device that supports reporting for conditional primary secondary cell addition or change in accordance with aspects of the present disclosure.

FIG. 9 shows a diagram of a system 900 including a device 905 that supports reporting for conditional primary secondary cell addition or change in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting reporting for conditional primary secondary cell addition or change). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving, from a master node associated with a primary cell, a configuration for a conditional procedure for adding or changing a primary secondary cell associated with a secondary node. The communications manager 920 may be configured as or otherwise support a means for receiving, from the master node, a configuration for a handover procedure for the primary cell. The communications manager 920 may be configured as or otherwise support a means for transmitting a report including information related to the conditional procedure, information related to the primary secondary cell, or both, based on a triggering order between the conditional procedure and the handover procedure.

By including or configuring the communications manager 920 in accordance with examples as described herein, the device 905 may support techniques for improved communications, more efficient utilization of communication resources, improved coordination between devices, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of reporting for conditional primary secondary cell addition or change as described herein, or the processor 940 and the memory 930 may be otherwise configured to perform or support such operations.

Figure 10:
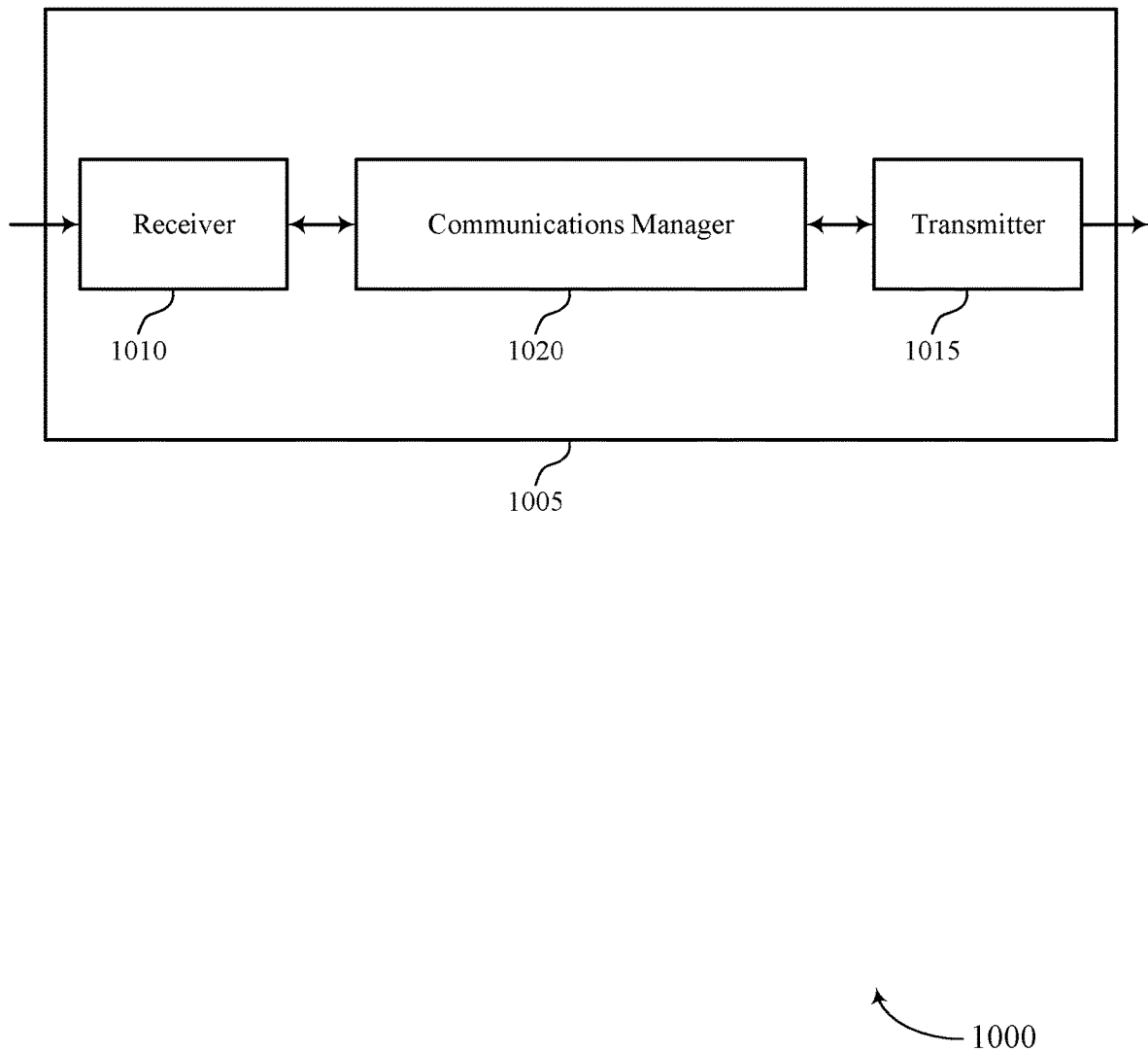
FIG. 10 shows a block diagram of an apparatus that supports reporting for conditional primary secondary cell addition or change in accordance with aspects of the present disclosure.

FIG. 10 shows a block diagram 1000 of a device 1005 that supports reporting for conditional primary secondary cell addition or change in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to reporting for conditional primary secondary cell addition or change). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to reporting for conditional primary secondary cell addition or change). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of reporting for conditional primary secondary cell addition or change as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a master node in accordance with examples as disclosed herein. For example, the communications manager 1020 may be configured as or otherwise support a means for transmitting, to a UE, a configuration for a conditional procedure for changing or adding a primary secondary cell associated with a secondary node. The communications manager 1020 may be configured as or otherwise support a means for transmitting, to the UE, a configuration for a handover procedure for a primary cell associated with the master node. The communications manager 1020 may be configured as or otherwise support a means for receiving a report including information related to the conditional procedure, information related to the primary secondary cell, or both, from a second master node involved in the handover procedure after successful handover of the primary cell to the second master node.

Additionally or alternatively, the communications manager 1020 may support wireless communication at a master node in accordance with examples as disclosed herein. For example, the communications manager 1020 may be configured as or otherwise support a means for participating in a successful handover procedure with a UE and a second master node. The communications manager 1020 may be configured as or otherwise support a means for receiving a report including information related to the conditional procedure, information related to the primary secondary cell, or both, from the UE based on the successful handover procedure. The communications manager 1020 may be configured as or otherwise support a means for transmitting at least some of the information from the report to the second master node based on receiving the report from the UE.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for improved communications, more efficient utilization of communication resources, improved coordination between devices, and improved utilization of processing capability.

Figure 11:
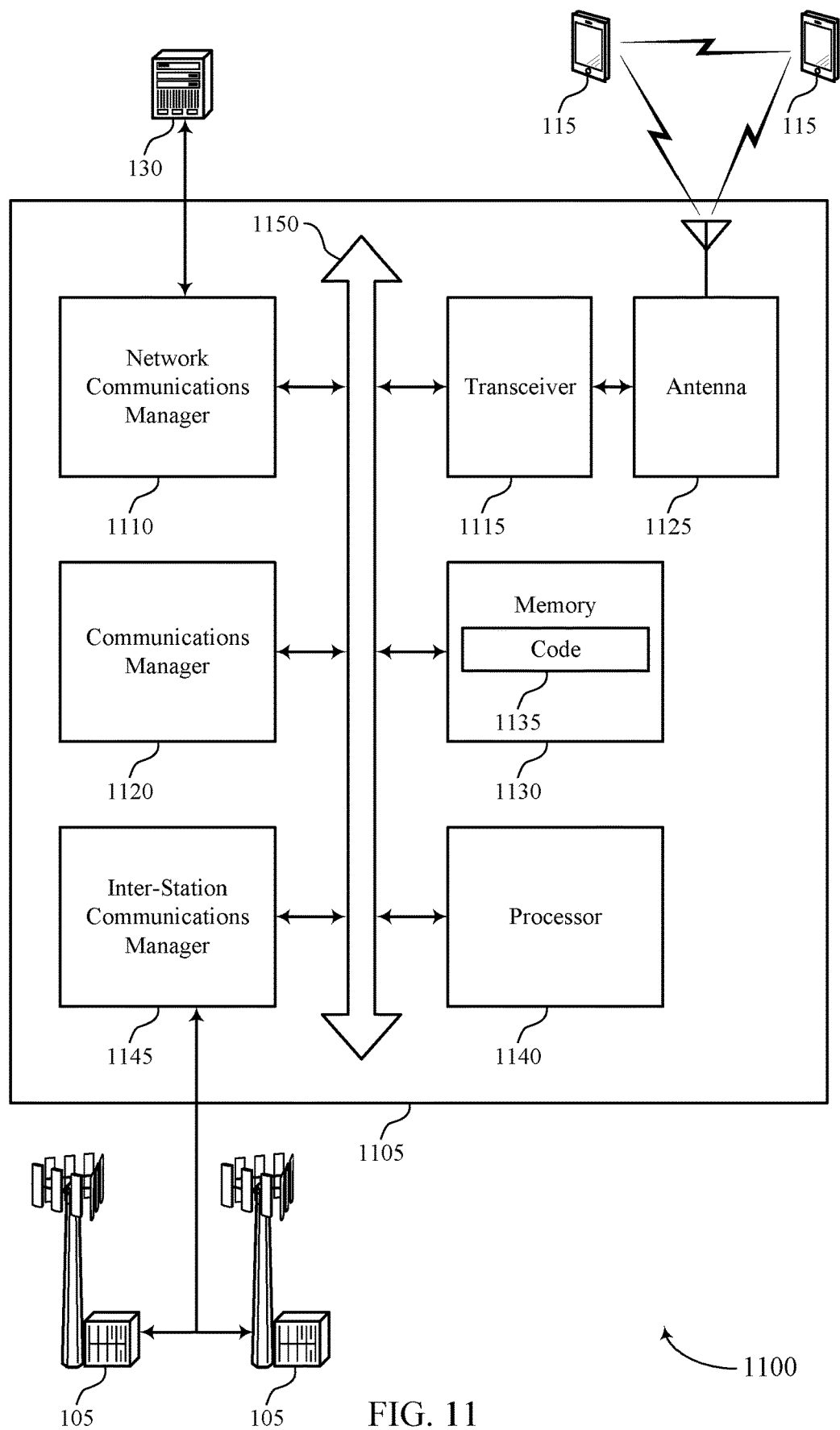
FIG. 11 shows a diagram of a system including a device that supports reporting for conditional primary secondary cell addition or change in accordance with aspects of the present disclosure.

FIG. 11 shows a diagram of a system 1100 including a device 1105 that supports reporting for conditional primary secondary cell addition or change in accordance with aspects of the present disclosure. The device 1105 may be an example of or include the components of a device 1005 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 1015, a transmitter, a receiver 1010, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting reporting for conditional primary secondary cell addition or change). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a master node in accordance with examples as disclosed herein. For example, the communications manager 1120 may be configured as or otherwise support a means for transmitting, to a UE, a configuration for a conditional procedure for changing or adding a primary secondary cell associated with a secondary node. The communications manager 1120 may be configured as or otherwise support a means for transmitting, to the UE, a configuration for a handover procedure for a primary cell associated with the master node. The communications manager 1120 may be configured as or otherwise support a means for receiving a report including information related to the conditional procedure, information related to the primary secondary cell, or both, from a second master node involved in the handover procedure after successful handover of the primary cell to the second master node.

Additionally or alternatively, the communications manager 1120 may support wireless communication at a master node in accordance with examples as disclosed herein. For example, the communications manager 1120 may be configured as or otherwise support a means for participating in a successful handover procedure with a UE and a second master node. The communications manager 1120 may be configured as or otherwise support a means for receiving a report including information related to the conditional procedure, information related to the primary secondary cell, or both, from the UE based on the successful handover procedure. The communications manager 1120 may be configured as or otherwise support a means for transmitting at least some of the information from the report to the second master node based on receiving the report from the UE.

By including or configuring the communications manager 1120 in accordance with examples as described herein, the device 1105 may support techniques for improved communications, more efficient utilization of communication resources, improved coordination between devices, and improved utilization of processing capability.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of reporting for conditional primary secondary cell addition or change as described herein, or the processor 1140 and the memory 1130 may be otherwise configured to perform or support such operations.

Figure 12:
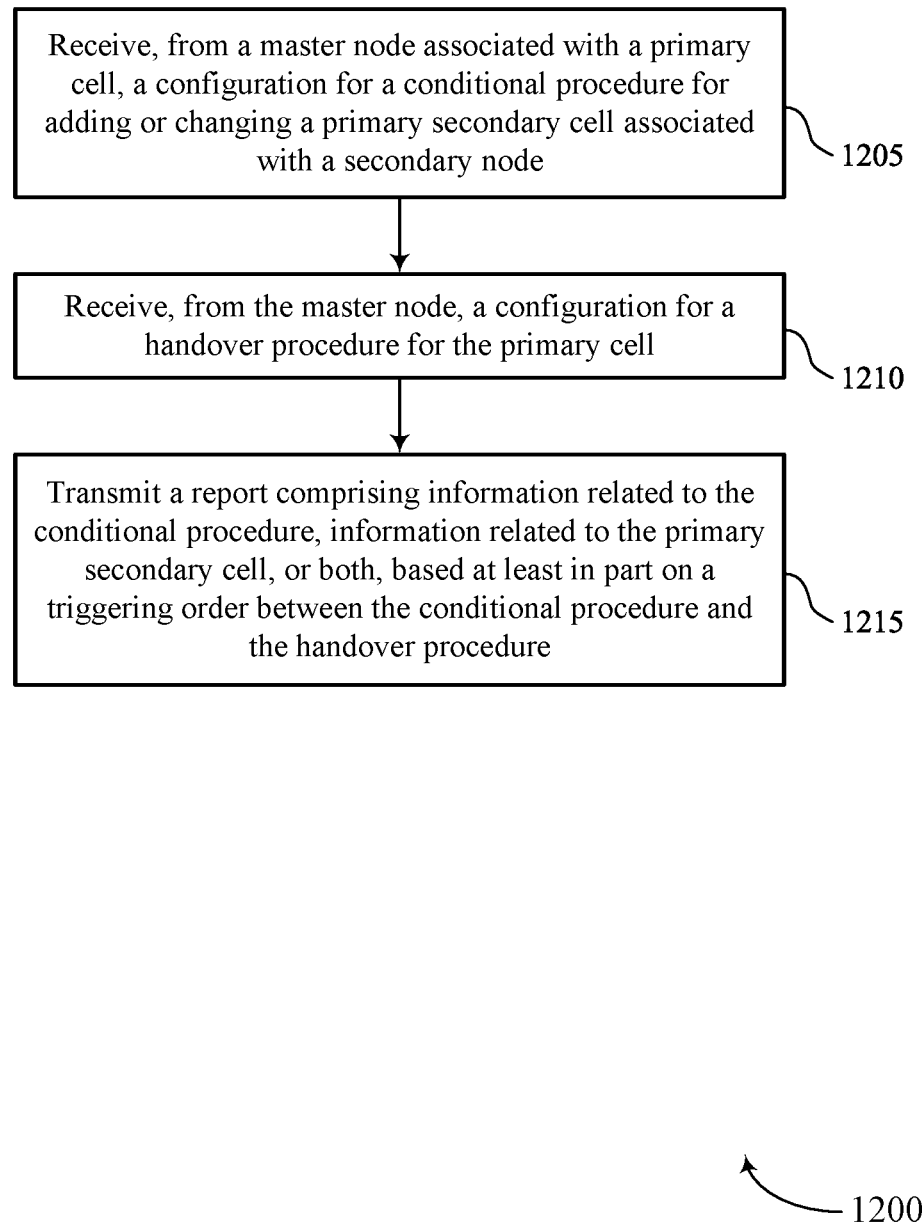
FIGS. 12 through 14 show flowcharts illustrating methods that support reporting for conditional primary secondary cell addition or change in accordance with aspects of the present disclosure.

FIG. 12 shows a flowchart illustrating a method 1200 that supports reporting for conditional primary secondary cell addition or change in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1205, the method may include receiving, from a master node associated with a primary cell, a configuration for a conditional procedure for adding or changing a primary secondary cell associated with a secondary node. The operations of 1205 may be performed in accordance with examples as disclosed herein. In some examples, aspects of the operations of 1205 may be performed by a CPAC component 825 as described with reference to FIG. 8.

At 1210, the method may include receiving, from the master node, a configuration for a handover procedure for the primary cell. The operations of 1210 may be performed in accordance with examples as disclosed herein. In some examples, aspects of the operations of 1210 may be performed by a handover component 830 as described with reference to FIG. 8.

At 1215, the method may include transmitting a report including information related to the conditional procedure, information related to the primary secondary cell, or both, based on a triggering order between the conditional procedure and the handover procedure. The operations of 1215 may be performed in accordance with examples as disclosed herein. In some examples, aspects of the operations of 1215 may be performed by a reporting component 835 as described with reference to FIG. 8.

Figure 13:
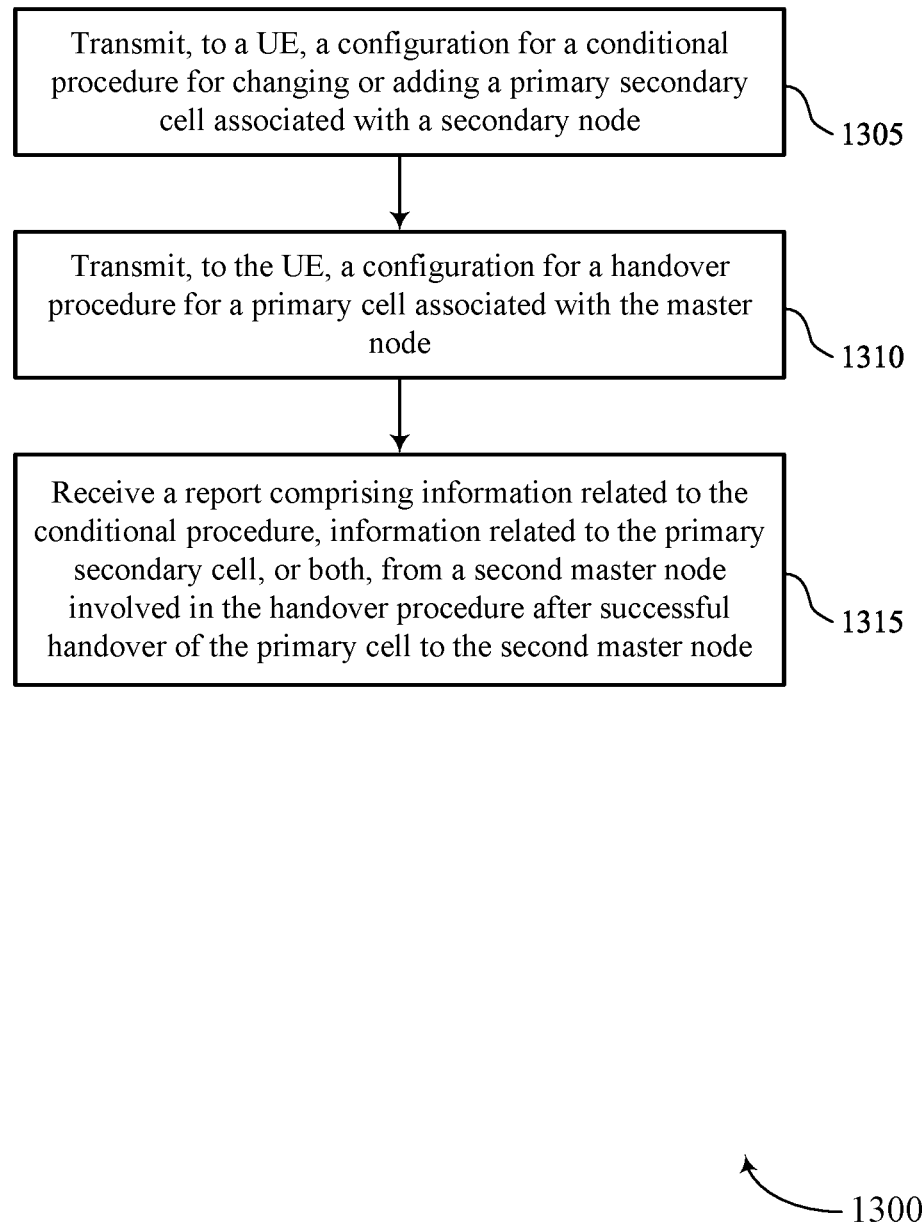

FIG. 13 shows a flowchart illustrating a method 1300 that supports reporting for conditional primary secondary cell addition or change in accordance with aspects of the present disclosure. The operations of the method 1300 may be implemented by a base station or its components as described herein. For example, the operations of the method 1300 may be performed by a base station 105 as described with reference to FIGS. 1 through 5 and 10 and 11. In some examples, a base station may execute a set of instructions to control the functional elements of the base station to perform the described functions. Additionally or alternatively, the base station may perform aspects of the described functions using special-purpose hardware.

At 1305, the method may include transmitting, to a UE, a configuration for a conditional procedure for changing or adding a primary secondary cell associated with a secondary node. The operations of 1305 may be performed in accordance with examples as disclosed herein.

At 1310, the method may include transmitting, to the UE, a configuration for a handover procedure for a primary cell associated with the master node. The operations of 1310 may be performed in accordance with examples as disclosed herein.

At 1315, the method may include receiving a report including information related to the conditional procedure, information related to the primary secondary cell, or both, from a second master node involved in the handover procedure after successful handover of the primary cell to the second master node. The operations of 1315 may be performed in accordance with examples as disclosed herein.

Figure 14:
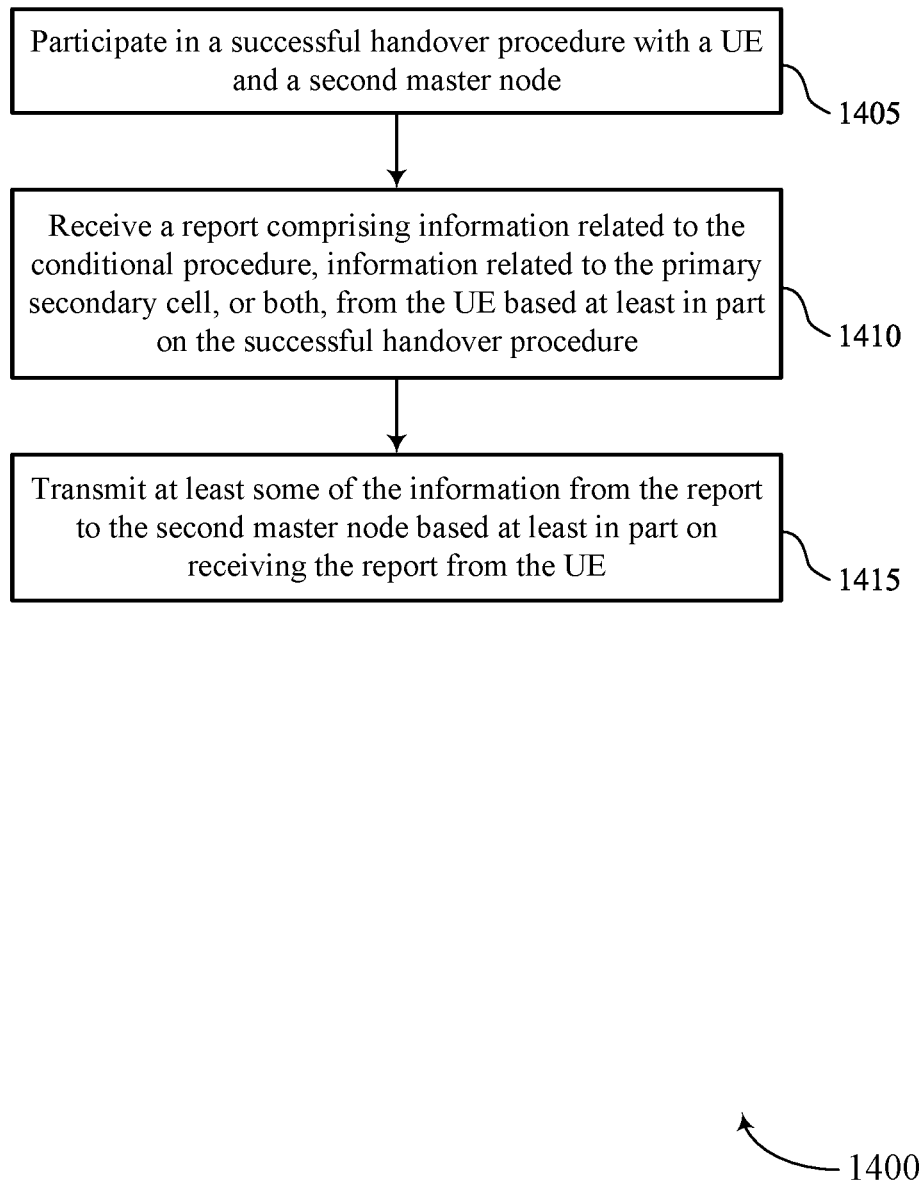

FIG. 14 shows a flowchart illustrating a method 1400 that supports reporting for conditional primary secondary cell addition or change in accordance with aspects of the present disclosure. The operations of the method 1400 may be implemented by a base station or its components as described herein. For example, the operations of the method 1400 may be performed by a base station 105 as described with reference to FIGS. 1 through 5 and 10 and 11. In some examples, a base station may execute a set of instructions to control the functional elements of the base station to perform the described functions. Additionally or alternatively, the base station may perform aspects of the described functions using special-purpose hardware.

At 1405, the method may include participating in a successful handover procedure with a UE and a second master node. The operations of 1405 may be performed in accordance with examples as disclosed herein.

At 1410, the method may include receiving a report including information related to the conditional procedure, information related to the primary secondary cell, or both, from the UE based on the successful handover procedure. The operations of 1410 may be performed in accordance with examples as disclosed herein.

At 1415, the method may include transmitting at least some of the information from the report to the second master node based on receiving the report from the UE. The operations of 1415 may be performed in accordance with examples as disclosed herein.

The following provides an overview of aspects of the present disclosure:

Aspect 1: A method for wireless communication at a UE, comprising: receiving, from a master node associated with a primary cell, a configuration for a conditional procedure for adding or changing a primary secondary cell associated with a secondary node; receiving, from the master node, a configuration for a handover procedure for the primary cell; and transmitting a report comprising information related to the conditional procedure, information related to the primary secondary cell, or both, based at least in part on a triggering order between the conditional procedure and the handover procedure.

Aspect 2: The method of aspect 1, wherein the handover procedure comprises a conditional handover procedure, the method further comprising: determining that the conditional procedure is triggered before the conditional handover procedure, wherein the report is transmitted to the master node based at least in part on determining that the conditional procedure is triggered before the conditional handover procedure.

Aspect 3: The method of aspect 2, further comprising: determining that the conditional procedure has failed, wherein the report indicates the conditional procedure failure; and including in the report, based at least in part on determining that the conditional procedure has failed, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

Aspect 4: The method of aspect 3, wherein the measurement information comprises measurement information for the primary secondary cell, measurement information for a target primary secondary cell, or both, measurement information for one or more neighboring cells, an indication of whether the one or more neighboring cells are candidate cells for the conditional procedure, or a combination thereof.

Aspect 5: The method of aspect 4, wherein the report is for a first radio access technology and the measurement information comprises measurement information for frequencies for a second radio access technology different than the first radio access technology.

Aspect 6: The method of any of aspects 3 through 5, wherein the timing information comprises a duration between receiving the configuration for the conditional procedure and the conditional procedure failing, a duration between receiving the configuration for the conditional procedure and attempting the conditional procedure, a duration between receiving the configuration for the conditional procedure and attempting a non-conditional procedure for adding or changing the primary secondary cell, a duration between the failed conditional procedure and a second failed conditional procedure, or a combination thereof.

Aspect 7: The method of any of aspects 3 through 6, wherein the condition information comprises a list of primary secondary cells that have met a set of conditions for triggering the conditional procedure, and indication of whether a target primary secondary cell was a candidate cell for the conditional procedure, or a combination thereof.

Aspect 8: The method of any of aspects 3 through 7, wherein the state information comprises an indication of a state of the primary secondary cell before reception of the configuration for the conditional procedure, an indication of a state of the primary secondary cell before attempting the conditional procedure, an indication of whether a state of the primary secondary cell was changed during the conditional procedure, an indication of whether a state of the primary secondary cell was changed between reception of the configuration for the conditional procedure and attempting the conditional procedure, or a combination thereof.

Aspect 9: The method of any of aspects 2 through 8, further comprising: determining radio link failure at the primary cell during the conditional procedure, wherein the report indicates the radio link failure and is transmitted to the master node based at least in part on the determining the radio link failure; and including in the report, based at least in part on determining the radio link failure, an indication of whether the configuration for the conditional handover procedure was discarded based at least in part on the conditional procedure triggering, an indication of a duration between receiving the configuration for the conditional handover procedure and the conditional procedure triggering, an indication of a duration between the conditional procedure triggering and the radio link failure, an indication of a duration between receiving the configuration for the conditional handover procedure and receiving a command modifying the conditional handover procedure, measurement information for the primary secondary cell, or a combination thereof.

Aspect 10: The method of aspect 9, further comprising: determining that the conditional procedure has failed, wherein the report indicates the conditional procedure failure; and including in the report, based at least in part on the conditional procedure failing, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

Aspect 11: The method of any of aspects 2 through 10, further comprising: determining that the conditional procedure was successful, the conditional handover procedure was successful, or both; and including in the report, based at least in part on the conditional procedure being successful, the conditional handover procedure being successful, or both, an identifier of the primary secondary cell, an identifier of a target primary secondary cell, a state of the primary secondary cell, an indication of a duration of time the primary secondary cell was in the state before the conditional procedure, or a combination thereof.

Aspect 12: The method of aspect 11, further comprising: including in the report one or more of radio link management results for the primary secondary cell, an indication of whether a radio link management issue or beam failure detection issue for the primary secondary cell has been detected, measurement information obtained for neighboring primary secondary cells before the configuration for the conditional procedure was received, measurement information obtained for the primary secondary cell, for candidate primary secondary cells for the conditional procedure, or a combination thereof, an indication of triggering conditions for the candidate primary secondary cells, a radio quality metric for the primary secondary cell, an indication of whether a radio quality metric for the primary secondary cell has deteriorated during the conditional procedure, or a combination thereof, an indication of a duration between receiving the configuration for the conditional handover procedure and the conditional procedure triggering, an indication of a duration between the conditional procedure triggering and detecting a lower layer issue at the primary cell, or an indication of a duration between the conditional procedure triggering and radio link failure at the primary cell.

Aspect 13: The method of any of aspects 11 through 12, further comprising: determining a triggering condition for the report is satisfied, wherein the triggering condition comprises a timer for the primary secondary cell satisfying a threshold, a timer for the primary cell satisfying a threshold, or a combination thereof, and wherein the report is transmitted based at least in part on the triggering condition being satisfied.

Aspect 14: The method of aspect 1, wherein the handover procedure comprises a conditional handover procedure, the method further comprising: determining that the conditional handover procedure is triggered before, or concurrently with, the conditional procedure, wherein the report is transmitted to the master node based at least in part on the determination.

Aspect 15: The method of aspect 14, further comprising: determining radio link failure at the primary secondary cell during the conditional handover procedure, wherein the report indicates the radio link failure; and including in the report, based at least in part on determining the radio link failure, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

Aspect 16: The method of any of aspects 14 through 15, further comprising: determining that the conditional handover procedure has failed, wherein the report indicates the conditional handover procedure failure; and including in the report, based at least in part on determining that the conditional handover procedure has failed, an indication of whether the configuration for the conditional procedure was discarded based at least in part on the conditional handover procedure triggering, an indication of a duration between receiving the configuration for the conditional procedure and the conditional handover procedure triggering, an indication of a duration between the conditional handover procedure triggering and radio link failure at the primary secondary cell, measurement information for the primary secondary cell, or a combination thereof.

Aspect 17: The method of aspect 16, further comprising: determining radio link failure at the primary secondary cell, wherein the report indicates the radio link failure; and including in the report, based at least in part on the determining the radio link failure, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

Aspect 18: The method of any of aspects 14 through 17, further comprising: determining that the conditional procedure was successful, the conditional handover procedure was successful, or both; and including in the report, based at least in part on the conditional procedure being successful, the conditional handover procedure being successful, or both, an identifier of the primary secondary cell, an identifier of a target primary secondary cell, a state of the primary secondary cell, an indication of a duration of time the primary secondary cell was in the state before the conditional procedure, or a combination thereof.

Aspect 19: The method of aspect 18, further comprising: including in the report one or more of radio link management results for the primary secondary cell, an indication of whether a radio link management issue or beam failure detection issue for the primary secondary cell has been detected, measurement information obtained for neighboring primary secondary cells before the configuration for the conditional procedure was received, measurement information obtained for the primary secondary cell, for candidate primary secondary cells for the conditional procedure, or a combination thereof, an indication of triggering conditions for the candidate primary secondary cells, a radio quality metric for the primary secondary cell, an indication of whether a radio quality metric for the primary secondary cell has deteriorated during the conditional procedure, or a combination thereof, an indication of a duration between receiving the configuration for the conditional procedure and the conditional handover procedure triggering, or an indication of a duration between the conditional handover procedure triggering and detecting a radio link issue, a beam failure issue, or a lower layer issue at the primary cell Aspect 20: The method of aspect 1, wherein the handover procedure comprises a non-conditional handover procedure or a Dual Active Protocol Stack handover procedure, the method further comprising: determining whether the conditional procedure is triggered before receipt of a command triggering the handover procedure, wherein the report is transmitted based at least in part on the determination.

Aspect 21: The method of aspect 20, further comprising: determining radio link failure at the primary secondary cell during the handover procedure, wherein the report indicates the radio link failure; and including in the report, based at least in part on determining the radio link failure, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

Aspect 22: The method of any of aspects 20 through 21, further comprising: determining that the handover procedure has failed, wherein the report indicates the handover procedure failure; and including in the report, based at least in part on determining that the handover procedure failed, an indication of whether the configuration for the conditional procedure was received before the command triggering the handover procedure, an indication of a duration between triggering the conditional procedure and receipt of the command triggering the handover procedure, an indication of a duration between receiving the configuration for the conditional procedure and determining radio link failure at the primary secondary cell, measurement information for the primary secondary cell, measurement information for a target primary secondary cell, measurement information for one or more neighboring cells, an identifier of the primary secondary cell, an identifier of the target primary secondary cell, or a combination thereof.

Aspect 23: The method of aspect 22, further comprising: determining radio link failure at the primary secondary cell, wherein the report indicates the radio link failure; and including an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

Aspect 24: The method of any of aspects 20 through 23, further comprising: determining that the conditional procedure was successful, the handover procedure was successful, or both; and including in the report, based at least in part on the conditional procedure being successful, the handover procedure being successful, or both, an identifier of the primary secondary cell, an identifier of a target primary secondary cell, a state of the primary secondary cell, an indication of a duration of time the primary secondary cell was in the state before the conditional procedure, or a combination thereof.

Aspect 25: The method of aspect 24, further comprising: including in the report one or more of radio link management results for the primary secondary cell, an indication of whether a radio link management issue or beam failure detection issue for the primary secondary cell has been detected, measurement information obtained for neighboring primary secondary cells before the configuration for the conditional procedure was received, measurement information obtained for the primary secondary cell, for the target primary secondary cell, for candidate primary secondary cells for the conditional procedure, for one or more neighboring cells, or a combination thereof, an indication of triggering conditions for the candidate primary secondary cells, a radio quality metric for the primary secondary cell, an indication of whether a radio quality metric for the primary secondary cell has deteriorated during the conditional procedure, or a combination thereof, an indication of a duration between receiving the configuration conditional procedure triggering and receiving the command triggering the handover procedure, an indication of a duration between receiving the configuration for the conditional procedure and radio link failure at the primary cell, or an identifier of the primary secondary cell, an identifier of the target primary secondary cell, or a combination thereof.

Aspect 26: A method for wireless communication at a master node, comprising: transmitting, to a UE, a configuration for a conditional procedure for changing or adding a primary secondary cell associated with a secondary node; transmitting, to the UE, a configuration for a handover procedure for a primary cell associated with the master node; and receiving a report comprising information related to the conditional procedure, information related to the primary secondary cell, or both, from a second master node involved in the handover procedure after successful handover of the primary cell to the second master node.

Aspect 27: The method of aspect 26, wherein the report indicates radio link failure at the primary secondary cell, and the report comprises an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

Aspect 28: A method for wireless communication at a master node, comprising: participating in a successful handover procedure with a UE and a second master node; receiving a report comprising information related to the conditional procedure, information related to the primary secondary cell, or both, from the UE based at least in part on the successful handover procedure; and transmitting at least some of the information from the report to the second master node based at least in part on receiving the report from the UE.

Aspect 29: The method of aspect 28, wherein the report indicates radio link failure at the primary secondary cell, and the report comprises an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

Aspect 30: An apparatus for wireless communication at a UE, comprising a processor; memory coupled with the processor; and instructions stored in the memory and executable by the processor to cause the apparatus to perform a method of any of aspects 1 through 25.

Aspect 31: An apparatus for wireless communication at a UE, comprising at least one means for performing a method of any of aspects 1 through 25.

Aspect 32: A non-transitory computer-readable medium storing code for wireless communication at a UE, the code comprising instructions executable by a processor to perform a method of any of aspects 1 through 25.

Aspect 33: An apparatus for wireless communication at a master node, comprising a processor; memory coupled with the processor; and instructions stored in the memory and executable by the processor to cause the apparatus to perform a method of any of aspects 26 through 27.

Aspect 34: An apparatus for wireless communication at a master node, comprising at least one means for performing a method of any of aspects 26 through 27.

Aspect 35: A non-transitory computer-readable medium storing code for wireless communication at a master node, the code comprising instructions executable by a processor to perform a method of any of aspects 26 through 27.

Aspect 36: An apparatus for wireless communication at a master node, comprising a processor; memory coupled with the processor; and instructions stored in the memory and executable by the processor to cause the apparatus to perform a method of any of aspects 28 through 29.

Aspect 37: An apparatus for wireless communication at a master node, comprising at least one means for performing a method of any of aspects 28 through 29.

Aspect 38: A non-transitory computer-readable medium storing code for wireless communication at a master node, the code comprising instructions executable by a processor to perform a method of any of aspects 28 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor;
   memory coupled with the processor; and
   instructions stored in the memory and executable by the processor to cause the apparatus to:
      receive, from a master node associated with a primary cell, a configuration for a conditional procedure for adding or changing a primary secondary cell associated with a secondary node, wherein the conditional procedure is associated with a first set of one or more conditions for triggering the conditional procedure;
      receive, from the master node, a configuration for a handover procedure for the primary cell, wherein the handover procedure is associated with a second set of one or more conditions for triggering the handover procedure;
      determine an order in which the conditional procedure and the handover procedure are triggered based at least in part on an order in which the first set of one or more conditions and the second set of one or more conditions are satisfied; and
      transmit a report comprising information related to the conditional procedure, information related to the primary secondary cell, or both, wherein the information included in the report is based at least in part on the order in which the conditional procedure and the handover procedure are triggered.

2. The apparatus of claim 1, wherein the handover procedure comprises a conditional handover procedure, and wherein the instructions are further executable by the processor to cause the apparatus to:
   determine that the conditional procedure is triggered before the conditional handover procedure, wherein the report is transmitted to the master node based at least in part on determining that the conditional procedure is triggered before the conditional handover procedure.

3. The apparatus of claim 2, wherein the instructions are further executable by the processor to cause the apparatus to:
   determine that the conditional procedure has failed, wherein the report indicates the conditional procedure failure; and
   include in the report, based at least in part on determining that the conditional procedure has failed, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

4. The apparatus of claim 3, wherein the measurement information comprises measurement information for the primary secondary cell, measurement information for a target primary secondary cell, or both, measurement information for one or more neighboring cells, an indication of whether the one or more neighboring cells are candidate cells for the conditional procedure, or a combination thereof.

5. The apparatus of claim 4, wherein the report is for a first radio access technology and the measurement information comprises measurement information for frequencies for a second radio access technology different than the first radio access technology.

6. The apparatus of claim 3, wherein the timing information comprises a duration between receiving the configuration for the conditional procedure and the conditional procedure failing, a duration between receiving the configuration for the conditional procedure and attempting the conditional procedure, a duration between receiving the configuration for the conditional procedure and attempting the non-conditional procedure for adding or changing the primary secondary cell, a duration between the failed conditional procedure and a second failed conditional procedure, or a combination thereof.

7. The apparatus of claim 3, wherein the condition information comprises a list of primary secondary cells that have met the first set of one or more conditions for triggering the conditional procedure, and indication of whether a target primary secondary cell was a candidate cell for the conditional procedure, or a combination thereof.

8. The apparatus of claim 3, wherein the state information comprises an indication of a state of the primary secondary cell before reception of the configuration for the conditional procedure, an indication of a state of the primary secondary cell before attempting the conditional procedure, an indication of whether the state of the primary secondary cell was changed during the conditional procedure, an indication of whether the state of the primary secondary cell was changed between reception of the configuration for the conditional procedure and attempting the conditional procedure, or a combination thereof.

9. The apparatus of claim 2, wherein the instructions are further executable by the processor to cause the apparatus to:
determine radio link failure at the primary cell during the conditional procedure, wherein the report indicates the radio link failure and is transmitted to the master node based at least in part on the determining the radio link failure; and
include in the report, based at least in part on determining the radio link failure, an indication of whether the configuration for the conditional handover procedure was discarded based at least in part on the conditional procedure triggering, an indication of a duration between receiving the configuration for the conditional handover procedure and the conditional procedure triggering, an indication of a duration between the conditional procedure triggering and the radio link failure, an indication of a duration between receiving the configuration for the conditional handover procedure and receiving a command modifying the conditional handover procedure, measurement information for the primary secondary cell, or a combination thereof.

10. The apparatus of claim 9, wherein the instructions are further executable by the processor to cause the apparatus to:
determine that the conditional procedure has failed, wherein the report indicates the conditional procedure failure; and
include in the report, based at least in part on the conditional procedure failing, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

11. The apparatus of claim 2, wherein the instructions are further executable by the processor to cause the apparatus to:
determine that the conditional procedure was successful, the conditional handover procedure was successful, or both; and
include in the report, based at least in part on the conditional procedure being successful, the conditional handover procedure being successful, or both, an identifier of the primary secondary cell, an identifier of a target primary secondary cell, a state of the primary secondary cell, an indication of a duration of time the primary secondary cell was in the state before the conditional procedure, or a combination thereof.

12. The apparatus of claim 11, wherein the instructions are further executable by the processor to cause the apparatus to:
include in the report one or more of:
radio link management results for the primary secondary cell,
an indication of whether a radio link management issue or beam failure detection issue for the primary secondary cell has been detected,
measurement information obtained for neighboring primary secondary cells before the configuration for the conditional procedure was received,
measurement information obtained for the primary secondary cell, for candidate primary secondary cells for the conditional procedure, or a combination thereof,
an indication of triggering conditions for the candidate primary secondary cells,
a radio quality metric for the primary secondary cell, an indication of whether a radio quality metric for the primary secondary cell has deteriorated during the conditional procedure, or a combination thereof,
an indication of a duration between receiving the configuration for the conditional handover procedure and the conditional procedure triggering,
an indication of a duration between the conditional procedure triggering and detecting a lower layer issue at the primary cell, or
an indication of a duration between the conditional procedure triggering and radio link failure at the primary cell.

13. The apparatus of claim 11, wherein the instructions are further executable by the processor to cause the apparatus to:
determine a triggering condition for the report is satisfied, wherein the triggering condition comprises a timer for the primary secondary cell satisfying a first threshold, a timer for the primary cell satisfying a second threshold, or a combination thereof, and wherein the report is transmitted based at least in part on the triggering condition being satisfied.

14. The apparatus of claim 1, wherein the handover procedure comprises a conditional handover procedure, and wherein the instructions are further executable by the processor to cause the apparatus to:
determine that the conditional handover procedure is triggered before, or concurrently with, the conditional procedure, wherein the report is transmitted to the master node based at least in part on the determination.

15. The apparatus of claim 14, wherein the instructions are further executable by the processor to cause the apparatus to:

determine radio link failure at the primary secondary cell during the conditional handover procedure, wherein the report indicates the radio link failure; and include in the report, based at least in part on determining the radio link failure, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

16. The apparatus of claim 14, wherein the instructions are further executable by the processor to cause the apparatus to:

determine that the conditional handover procedure has failed, wherein the report indicates the conditional handover procedure failure; and include in the report, based at least in part on determining that the conditional handover procedure has failed, an indication of whether the configuration for the conditional procedure was discarded based at least in part on the conditional handover procedure triggering, an indication of a duration between receiving the configuration for the conditional procedure and the conditional handover procedure triggering, an indication of a duration between the conditional handover procedure triggering and radio link failure at the primary secondary cell, measurement information for the primary secondary cell, or a combination thereof.

17. The apparatus of claim 16, wherein the instructions are further executable by the processor to cause the apparatus to:

determine radio link failure at the primary secondary cell, wherein the report indicates the radio link failure; and include in the report, based at least in part on the determining the radio link failure, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

18. The apparatus of claim 14, wherein the instructions are further executable by the processor to cause the apparatus to:

determine that the conditional procedure was successful, the conditional handover procedure was successful, or both; and include in the report, based at least in part on the conditional procedure being successful, the conditional handover procedure being successful, or both, an identifier of the primary secondary cell, an identifier of a target primary secondary cell, a state of the primary secondary cell, an indication of a duration of time the primary secondary cell was in the state before the conditional procedure, or a combination thereof.

19. The apparatus of claim 18, wherein the instructions are further executable by the processor to cause the apparatus to:

include in the report one or more of:
radio link management results for the primary secondary cell,
an indication of whether a radio link management issue or beam failure detection issue for the primary secondary cell has been detected,
measurement information obtained for neighboring primary secondary cells before the configuration for the conditional procedure was received,
measurement information obtained for the primary secondary cell, for candidate primary secondary cells for the conditional procedure, or a combination thereof,
an indication of triggering conditions for the candidate primary secondary cells,
a radio quality metric for the primary secondary cell, an indication of whether a radio quality metric for the primary secondary cell has deteriorated during the conditional procedure, or a combination thereof,
an indication of a duration between receiving the configuration for the conditional procedure and the conditional handover procedure triggering, or
an indication of a duration between the conditional handover procedure triggering and detecting a radio link issue, a beam failure issue, or a lower layer issue at the primary cell.

20. The apparatus of claim 1, wherein the handover procedure comprises a non-conditional handover procedure or a Dual Active Protocol Stack handover procedure, and wherein the instructions are further executable by the processor to cause the apparatus to:

determine whether the conditional procedure is triggered before receipt of a command triggering the handover procedure, wherein the second set of one or more conditions comprises receipt of the command, and wherein the report is transmitted based at least in part on the determination.

21. The apparatus of claim 20, wherein the instructions are further executable by the processor to cause the apparatus to:

determine radio link failure at the primary secondary cell during the handover procedure, wherein the report indicates the radio link failure; and include in the report, based at least in part on determining the radio link failure, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

22. The apparatus of claim 20, wherein the instructions are further executable by the processor to cause the apparatus to:

determine that the handover procedure has failed, wherein the report indicates the handover procedure failure; and include in the report, based at least in part on determining that the handover procedure failed, an indication of whether the configuration for the conditional procedure was received before the command triggering the handover procedure, an indication of a duration between triggering the conditional procedure and receipt of the command triggering the handover procedure, an indication of a duration between receiving the configuration for the conditional procedure and determining radio link failure at the primary secondary cell, measurement information for the primary secondary cell, measurement information for a target primary secondary cell, measurement information for one or more neighboring cells, an identifier of the primary secondary cell, an identifier of the target primary secondary cell, or a combination thereof.

23. The apparatus of claim 22, wherein the instructions are further executable by the processor to cause the apparatus to:

determine radio link failure at the primary secondary cell, wherein the report indicates the radio link failure; and include an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

24. The apparatus of claim 20, wherein the instructions are further executable by the processor to cause the apparatus to:

determine that the conditional procedure was successful, the handover procedure was successful, or both; and include in the report, based at least in part on the conditional procedure being successful, the handover procedure being successful, or both, an identifier of the primary secondary cell, an identifier of a target primary secondary cell, a state of the primary secondary cell, an indication of a duration of time the primary secondary cell was in the state before the conditional procedure, or a combination thereof.

25. The apparatus of claim 24, wherein the instructions are further executable by the processor to cause the apparatus to:

include in the report one or more of:
radio link management results for the primary secondary cell,
an indication of whether a radio link management issue or beam failure detection issue for the primary secondary cell has been detected,
measurement information obtained for neighboring primary secondary cells before the configuration for the conditional procedure was received,
measurement information obtained for the primary secondary cell, for the target primary secondary cell, for candidate primary secondary cells for the conditional procedure, for one or more neighboring cells, or a combination thereof,
an indication of triggering conditions for the candidate primary secondary cells,
a radio quality metric for the primary secondary cell, an indication of whether a radio quality metric for the primary secondary cell has deteriorated during the conditional procedure, or a combination thereof,
an indication of a duration between the conditional procedure triggering and receiving the command triggering the handover procedure,
an indication of a duration between receiving the configuration for the conditional procedure and radio link failure at the primary cell, or
an identity of the primary secondary cell, an identity of the target primary secondary cell, or a combination thereof.

26. A method for wireless communication at a user equipment (UE), comprising:

receiving, from a master node associated with a primary cell, a configuration for a conditional procedure for adding or changing a primary secondary cell associated with a secondary node, wherein the conditional procedure is associated with a first set of one or more conditions for triggering the conditional procedure;

receiving, from the master node, a configuration for a handover procedure for the primary cell, wherein the handover procedure is associated with a second set of one or more conditions for triggering the handover procedure;

determining an order in which the conditional procedure and the handover procedure are triggered based at least in part on an order in which the first set of one or more conditions and the second set of one or more conditions are satisfied; and transmitting a report comprising information related to the conditional procedure, information related to the primary secondary cell, or both, wherein the information included in the report is based at least in part on the order in which the conditional procedure and the handover procedure are triggered.

27. The method of claim 26, wherein the handover procedure comprises a conditional handover procedure, the method further comprising:

determining that the conditional procedure is triggered before the conditional handover procedure, wherein the report is transmitted to the master node based at least in part on determining that the conditional procedure is triggered before the conditional handover procedure.

28. The method of claim 27, further comprising:

determining that the conditional procedure has failed, wherein the report indicates the conditional procedure failure; and including in the report, based at least in part on determining that the conditional procedure has failed, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

29. The method of claim 27, further comprising:

determining radio link failure at the primary cell during the conditional procedure, wherein the report indicates the radio link failure and is transmitted to the master node based at least in part on the determining the radio link failure; and including in the report, based at least in part on determining the radio link failure, an indication of whether the configuration for the conditional handover procedure was discarded based at least in part on the conditional procedure triggering, an indication of a duration between receiving the configuration for the conditional handover procedure and the conditional procedure triggering, an indication of a duration between the conditional procedure triggering and the radio link failure, an indication of a duration between receiving the configuration for the conditional handover procedure and receiving a command modifying the conditional handover procedure, measurement information for the primary secondary cell, or a combination thereof.

30. The method of claim 29, further comprising:

determining that the conditional procedure has failed, wherein the report indicates the conditional procedure failure; and including in the report, based at least in part on the conditional procedure failing, an indication of whether the conditional procedure or a non-conditional procedure for adding or changing the primary secondary cell was configured, measurement information associated with the conditional procedure, timing information associated with the conditional procedure, condition information associated with the conditional procedure, an indication of one or more reporting configurations for triggering the report, state information for the primary secondary cell, or a combination thereof.

* * * * *